(12) United States Patent
Wassef

(10) Patent No.: US 12,133,787 B2
(45) Date of Patent: Nov. 5, 2024

(54) ENDOSTEAL HORIZONTALLY PLACED DENTAL IMPLANT SYSTEM AND METHOD

(71) Applicant: Michael Wassef, Las Vegas, NV (US)

(72) Inventor: Michael Wassef, Las Vegas, NV (US)

( * ) Notice: Subject to any disclaimer, the term of this patent is extended or adjusted under 35 U.S.C. 154(b) by 247 days.

(21) Appl. No.: 17/613,947

(22) PCT Filed: Mar. 31, 2021

(86) PCT No.: PCT/US2021/025218
§ 371 (c)(1),
(2) Date: Nov. 24, 2021

(87) PCT Pub. No.: WO2021/202768
PCT Pub. Date: Oct. 7, 2021

(65) Prior Publication Data
US 2022/0265398 A1 Aug. 25, 2022

Related U.S. Application Data

(60) Provisional application No. 63/004,451, filed on Apr. 2, 2020.

(51) Int. Cl.
*A61C 8/00* (2006.01)
(52) U.S. Cl.
CPC ............ *A61C 8/0053* (2013.01); *A61C 8/001* (2013.01); *A61C 8/0022* (2013.01); *A61C 8/003* (2013.01); *A61C 8/0074* (2013.01)

(58) Field of Classification Search
CPC ..... A61C 13/225; A61C 13/26; A61C 13/265; A61C 13/2656; A61C 8/0053; A61C 8/001; A61C 8/0022; A61C 8/003; A61C 8/0074
See application file for complete search history.

(56) References Cited

U.S. PATENT DOCUMENTS

| | | | | |
|---|---|---|---|---|
| 2,775,816 A | * | 1/1957 | Crevison | A61C 13/225 433/177 |
| 4,571,185 A | * | 2/1986 | Rota | A61C 8/0018 433/173 |
| 5,194,000 A | * | 3/1993 | Dury | A61C 8/003 433/173 |
| 5,520,540 A | * | 5/1996 | Nardi | A61C 13/2656 433/172 |
| 5,564,926 A | * | 10/1996 | Branemark | A61C 8/0034 433/173 |
| 11,331,174 B2 | * | 5/2022 | Abdulrazzaq | A61C 13/235 |

(Continued)

*Primary Examiner* — Ralph A Lewis
(74) *Attorney, Agent, or Firm* — The Thornton Firm, LLC

(57) ABSTRACT

An endosteal horizontally placed non-crestal dental implant system including at least one dental implant having a proximal end, a distal end, an internal architecture, and a helical thread extending along the outside region between the proximal end and the distal end. The one or more implants are configured to be implanted horizontally or near horizontally by way of a non-crestal approach, into a mandible or maxilla and to engage with bone tissue. The system also includes at least one dental implant abutment having a proximal end for attaching to the said dental implant and a distal end configured for the attachment of a dental prosthesis. A method of diagnosis and treatment of edentulism using the endosteal horizontally placed non-crestal dental implant system is also recited.

18 Claims, 20 Drawing Sheets

(56) References Cited

U.S. PATENT DOCUMENTS

| | | | |
|---|---|---|---|
| 2005/0233282 A1* | 10/2005 | Mundwiler | A61C 8/0063 433/173 |
| 2010/0239993 A1* | 9/2010 | Baughman | A61C 7/08 433/6 |
| 2012/0189972 A1* | 7/2012 | Smith | A61C 8/0096 433/18 |
| 2014/0342314 A1* | 11/2014 | Chamblee | A61C 8/0013 433/167 |
| 2016/0113741 A1* | 4/2016 | Shatkin | A61F 5/566 128/848 |
| 2017/0281320 A1* | 10/2017 | Blackbeard | A61C 8/0037 |
| 2018/0110594 A1* | 4/2018 | Atkin | A61C 8/0027 |
| 2019/0254781 A1* | 8/2019 | Aparicio | A61C 8/0034 |

* cited by examiner

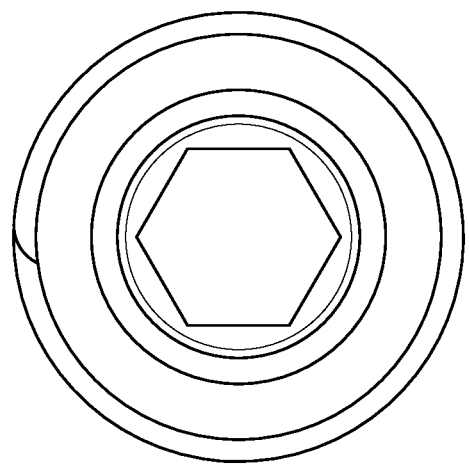
FIG 20A
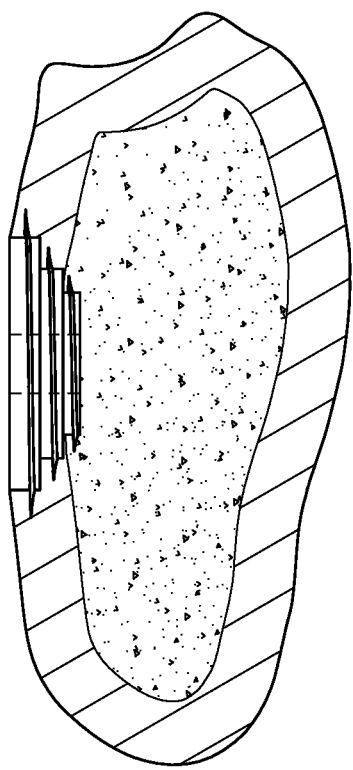
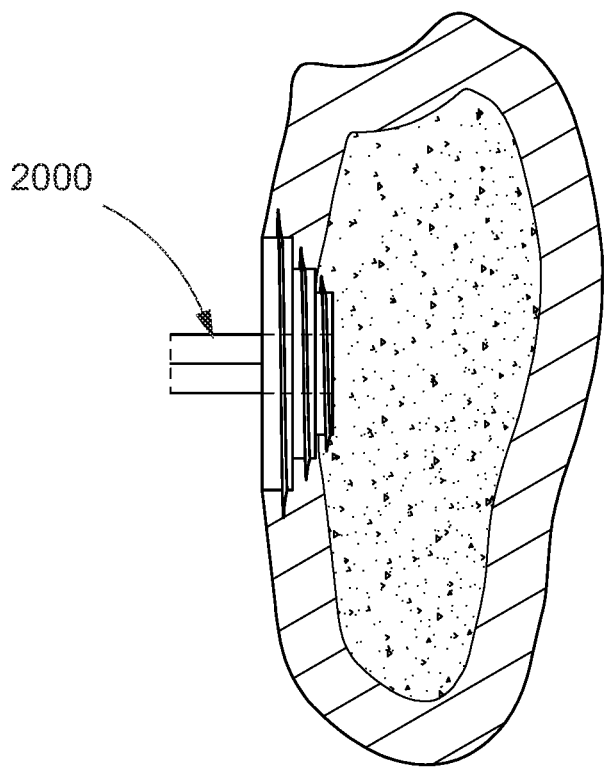
FIG 20B
FIG 20C

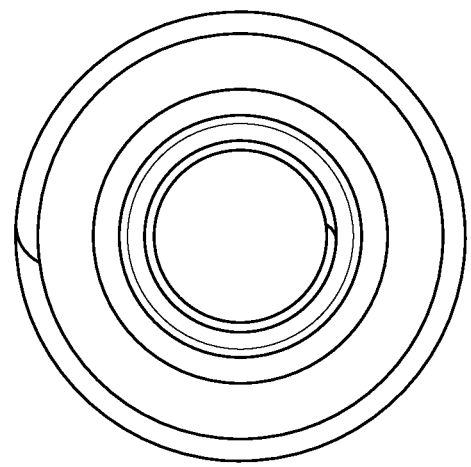
FIG 22A
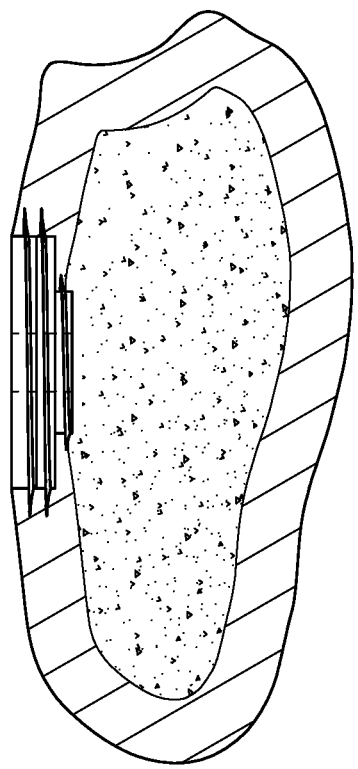 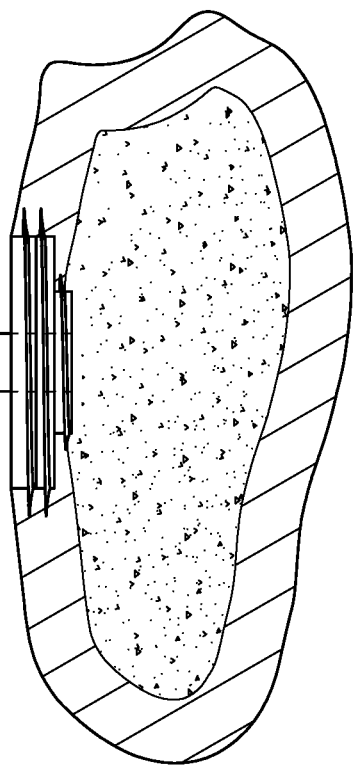
2200
FIG 22B FIG 22C

ENDOSTEAL HORIZONTALLY PLACED DENTAL IMPLANT SYSTEM AND METHOD

BACKGROUND OF THE INVENTION

1. Technical Field

The invention relates generally to the field of dental implants. More specifically, the present invention relates to a endosteal horizontally placed dental implant system and method.

2. Background Art

Edentulism is the condition of having lost one or more teeth. Tooth loss is a problem experienced by millions of adults. Tooth loss may involve one or more teeth by factors ranging from injury to periodontal disease. Since edentulism is irreversible and is often progressive, it is one of the factors that closely mark a decline in a patient's overall state of oral health.

There are two types of edentulism. Partial edentulism means the partial loss of the functional dentition. Stated differently, this means the loss of one or several, but not all teeth. This definition also refers to the loss of functional teeth. Total edentulism refers to the total loss of the functional dentition. Total edentulism is more common in mature and senior patients, and can be caused for several reasons, of which the most prevalent are periodontal problems, severe bruxism, or continual bone loss. Total edentulism is typically the result of progressive and prolonged lack of dental care but can be also caused by trauma.

The problems of edentulism and tooth loss are far more encompassing than limitation in function. Side issues present many psychosocial implications in patients, such as the fear of aging, social inhibition, and diminished self-image.

The most common solution to tooth loss is the wearing of removable appliances capable of replacing missing teeth commonly known as partials or dentures. In the United States, there are roughly 30-40 million denture wearers. There are an additional 49 million people wearing partial dentures or bridges. Many of these patients have, or will have, loose or ill-fitting dentures.

In patients with missing teeth, the bones in the mouth (i.e. maxilla and mandible) continue to decrease in volume, width, and height over time. Because dentures are placed superior to, or on top of the gum line, no direct stimulation is provided to the underlying jaw bones. Over time, this lack of stimulation causes the bone to resorb and deteriorate. Because traditional dentures and bridges rely on the jaw bones to hold them in place, people suffering bone loss often experience loosening of their dentures and problems eating and speaking. Eventually, bone loss may become so severe that dentures cannot be held in place even with strong adhesives, and a new set may be required. Though proper denture care, repair, and refitting are essential to maintaining oral health, bone loss may still occur. Fabricating a new prosthesis for patients suffering from bone atrophy is not a guarantee that the new prosthesis will sufficiently solve their problems regarding a "loose fitting" or mobile denture; as the core cause for having loose dentures is not corrected, which is loss of bone volume and/or width and/or height.

A recent survey published in DENTAL PRODUCTS REPORT demonstrated that about 95% of patients may be dissatisfied with their current dentures. The two most important features in denture satisfaction appear to be comfort and esthetics. Additionally, about one-third of respondents are looking to replace their existing dentures within the year.

The use of dental implants has become a widely accepted and increasingly cost-effective alternative to the use of bridges and dentures. Dental implants are essentially replacement tooth roots that are inserted vertically into the alveoli in both the maxilla and mandible. Such implants resemble a screw around which bone may grow. A crown or denture is mounted to the dental implant. Dental implants provide a strong foundation for fixed (permanent) or removable replacement teeth and can be custom made to match an individual's natural teeth.

Dental implants have become the most frequently recommended choice to replace missing teeth in both partially and fully edentulous patients. Dental implants function essentially like an artificial tooth root. Traditional dental implants are inserted crestally (i.e. inserted from the crest of the ridge, and progressing vertically or near vertically away from the ridge—superior to inferior into the bone) into a patient's jawbone. The patient's jawbone fuses with each implant to provide a secure platform for a dental prosthesis. An abutment is used for connecting pieces which join the prostheses to the implants. Supporting the popularity of this procedure, longitudinal studies have shown that when dental implant treatment is performed correctly and on the right patient, long-term implant survival and success rates are high.

The success of dental implants has not come without complications, though. Two types of complications occur in implant dentistry: biologic and technical (i.e., mechanical). Biologic complications are disturbances in the implant function characterized by biological processes affecting the supporting peri-implant tissues, namely, early and late implant failures, and adverse reactions in the peri-implant hard and soft tissues. Technical complications refer to mechanical damage of the implant, implant components and/or prosthesis.

The maxilla and mandible present very different surgical and restorative challenges because of bone quality and quality, ridge morphologic and resorptive patterns, location of anatomic structures, and biomechanical considerations. The selection of fixed vs removable implants is based on many factors. Among these are patient preference, cost, and ease of maintenance, as well as the clinical considerations of anatomy, bone quantity, quality, and arch form. The predictability of the long-term success of dental implants depends not only on design fabrication and material selection, but the state of a patient's bone tissue as well.

Patients who have suffered bone loss, however, may not be suitable candidates for conventional dental implants which are placed in through, and originate from, the crest of the ridge. Such an approach is known as a crestal approach. Traditionally, for successful osseointegration of dental implants and subsequently to be able to withstand the occlusal and masticatory forces necessary to retain or support a prosthesis; there needs to be a substantial and adequate osseointegrated surface area of the implant. Without this requisite osseointegrated surface area of the implant, the implant will fail due to lack of strength and support from the bone (lack of osseointegrated surface area). Sufficient bone height, along with adequate width must exist. Because of bone loss, there is oftentimes not enough bone in the maxilla and/or mandible to crestally insert dental implants into the mandible and maxilla, thereby not being able to help the patient retain the partial or complete denture.

Temporary Anchorage Devices (TADS) are small, screw-like dental implants made of a titanium alloy. As the name implies, they are temporary. TADS usually remain in place during a limited period over the course of treatment, and then they are removed. Their function is to provide a stable anchorage—that is, a fixed point around which other things (namely, teeth) can be moved. TADS can also provide an anchorage point for a pushing or pulling force that would otherwise need to be applied from outside the mouth, generally via orthodontic headgear. Wearing headgear can be uncomfortable, and compliance is sometimes a problem. In many situations TADS can eliminate the need for headgear, which has been a welcome development for many patients.

Like dental implants, which have been in use for decades, TADS are small, screw-like devices that are placed into the bone of the jaw. Unlike implants, however, they aren't usually required to become integrated with the jawbone or tooth bone itself. They are typically fixed in place by mechanical forces alone. And while such implants are useful for temporary purposes, TADS do not provide a permanent system for attaching dental prostheses, retentive elements and/or abutments, they are primarily used for orthodontics, not for restorative dentistry.

Presently, there exists a need for a dental implant system and method which overcomes the limitations in the prior art. There is a need for dentistry to procure a solution to the problem of loose dentures, especially for patients who have compromised vertical bone height and/or width.

SUMMARY OF INVENTION

The present invention meets the need for a dental implant system which overcomes the limitations in the prior art. At its essence, the invention includes at least one dental implant having a proximal end, a distal end, and a helical thread extending along the outside region between the said proximal end and the said distal end, each implant configured to be implanted horizontally or near horizontally by way of a non-crestal approach, into a mandible or maxilla and to engage with bone tissue; and at least one dental implant abutment having a proximal end for attaching to dental implant and a distal end configured for the attachment of a dental prosthesis. For purposes of this application, a non-crestal approach is defined as an approach from a direction which is not vertical or near vertical into the jawbone.

The invention in general includes a circular, cylindrical shaped metal alloy dental implant which is placed in the jaw(s) through a horizontal access preparation. The implants' diameters, radii, width, height, length, internal and external retentive architecture will vary depending on what the existing jaw morphology of the patient dictates. The invention will be geared to help patients who are not candidates for traditionally placed implants, by changing the design of traditional dental implants and placing the implants horizontally. By changing the placement dynamics of the implant, one also, without exception, vastly changes the physics of the mechanism of the implant/prosthetic mechanism. The horizontally placed dental implants are designed to successfully utilize otherwise seemingly unusable bone.

An object of the invention is to enable people who are not candidates for traditional implants (due to lack of bone volume, width, height or any combination of the three); to be able to obtain dental implants through non-traditional techniques of placement. Such a system and method would allow for a greater number of dental implant candidates. Persons currently suffering bone loss and loose dentures; would have a substantially improved quality of life.

The horizontally placed implant system is designed to be inserted intra-orally from the side of the jaw. The method of insertion may be performed from differing angles depending on the bone structure, composition and densities of the jawbone, and keeping in mind the final prosthetic result of individual patients. Such a system and method of insertion is unlike any other implant currently in use.

The shape of the horizontally placed dental implant may be circular, large, or small, one, two or more implants. The horizontally placed implant system may be inserted into the maxilla or the mandible. The implant architecture is different than traditional implants. In embodiments of the invention, the threads are different, the shape, length, etc. More importantly, the internal architecture may vary greatly from traditional dental implants. In one embodiment of the invention, there are actually two orifices in which the implant may accept either one abutment (attachment) or two. This versatile design is unlike any other implant currently in use. The orifices or openings will be at both ends of the implant. This will give an unparalleled, exponential escalation in the various retentive design options we can give our patients in attempting to stabilize the prosthesis. Utilization of the second orifice will be optional. In one embodiment, there will be a cover to the second orifice and there will be a mechanism to release this cover. When this covering is removed, the dentist will have access to the internal surface of the implant, thereby allowing the insertion of any attachment insert or abutment insert. These inserts may be screw retained, mechanically retained, removable or fixed. These inserts may also be mobile or immobile.

The horizontally placed dental implant system can also include a retractable "retentive arm" that extends from the center of the implant and into the oral cavity when activated. The retentive arm or arms can be configured to extend from the center of the circular implant, to both the cheek, and tongue areas of the mouth. The retentive arm can be a rigid structure, or the retentive arm can be made of a flexible material so as to offer movement depending on patient need; it may also be a combination of partially rigid and partially flexible materials on the same retentive arm. In one embodiment of the invention, the retentive arm can allow for mechanical activation via a specific tool that will result in the extension of the retentive arm, or arms. In alternative embodiments, a depressible activation may be employed. In alternative embodiments the implant may have varying internal architecture and design which will allow for rotational, and/or lateral movement of the retentive arm; this is in an effort to decrease the stress load on the retentive arm and/or implant fixture. The movements may be fully directional, in any direction on a 360-degree axis.

Insertion of the implant is performed horizontally, from lateral to medial or anterior to posterior, into the side of the jaw. This method is opposed to the known and understood crestal approach from the top of the ridge. The tools required for such a procedure will be different than a crestal approach. The surgical guide or "stent," a guide used to aid a dentist in placing the implant in the appropriate direction and orientation will also be different.

As a method of diagnosis and installation, a series of steps or functions may be implanted. In one such method, a pre-surgical evaluation using an imaging method such as, but not limited to radiographs, panoramic as well as cephalometric, and cone-beam computed tomography (CBCT) may be performed. Such an evaluation will give essential information to the dental and/or oral surgeon. After diagnostic evaluation, (clinical and radiographic), a determination may be made to proceed with the horizontally placed dental implant system. If a patient is prescribed the procedure, one or more appropriately sized implants (diameter and length) will be chosen. A surgical "stent" or guide is then fabricated. One or more incisions are made. Placement of a horizontally accessed dental implant is then performed using the surgical guide. The implant, which in one embodiment is evenly cylindrical in shape from top to bottom, is then horizontally inserted into the jawbone. The implant is then allowed to osseointegrate into a patient's jawbone. After osseointegration, one or more abutments are chosen to attach to the fused dental implants. The internal architecture of each implant will be able to accommodate a screw retained O-ball abutment or other suitable abutment. The denture or partial denture will have one or more female attachments which complement the O-ball abutment. The patient will then have an implant stabilized removable prosthesis.

It must be understood that in the endosteal horizontally placed dental implant system, an O-ball abutment is only one of the potentially infinite different types of attachments or abutment options available to the clinician. The choice and type of abutment will be ultimately be made by the clinician, and will primarily be dictated by the patient's clinical needs and goals. It must also be understood that the abutments or retentive elements, or its mechanisms may be rigid, flexible, or both rigid and flexible; either on the same individual abutment or retentive element, or its mechanisms.

It must be further understood that numerous dentures and prostheses, either full or partial, can be successfully attached to the horizontally placed implant system. Such a system offers a wide degree of versatility for patients lacking the crestal bone height for traditional crestal approach dental implants and techniques.

BRIEF DESCRIPTION OF DRAWINGS

The invention directed by way of example, and not by way of limitation, in the figures of the accompanying drawings and in which like reference numerals refer to similar elements and in which:

FIG. 20A is a front view of an abutment of the horizontally placed implant system in accordance with an embodiment of the invention;

FIG. 20B is a side sectional view of an abutment of the horizontally placed implant system in accordance with an embodiment of the invention;

FIG. 20C is a side sectional view of an abutment assembly of the horizontally placed implant system in accordance with an embodiment of the invention;

FIG. 22A is a front view of an abutment of the horizontally placed implant system in accordance with an embodiment of the invention;

FIG. 22B is a side sectional view of an abutment of the horizontally placed implant system in accordance with an embodiment of the invention;

FIG. 22C is a side sectional view of an abutment of the horizontally placed implant system in accordance with an embodiment of the invention;

Figure 1:
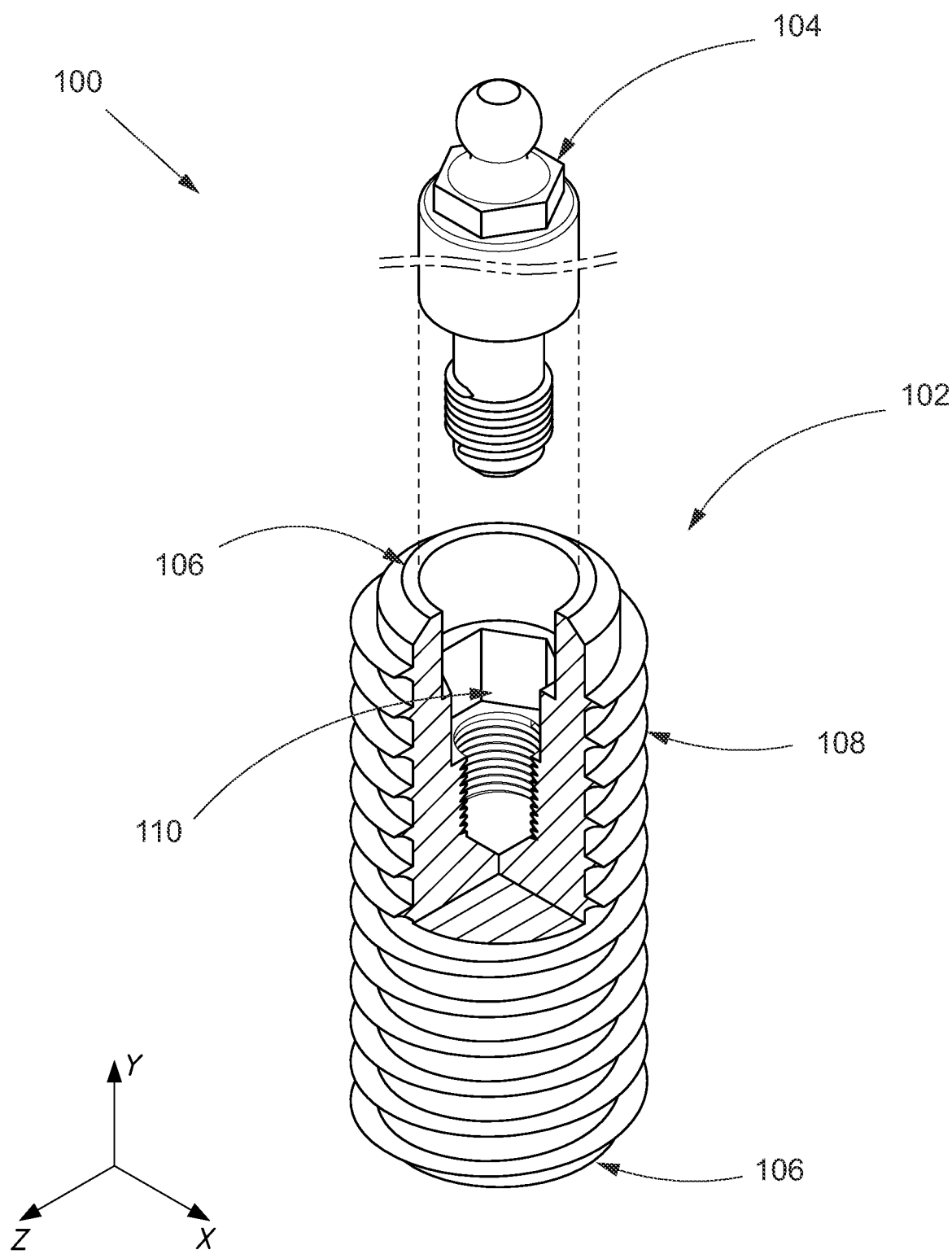
FIG. 1 is a perspective view of an implant body and separate O-ball attachment or abutment in accordance with an embodiment of the invention.

Unless otherwise indicated illustrations in the figures are not necessarily drawn to scale.

DETAILED DESCRIPTION OF EMBODIMENTS

Terminology used herein is used for the purpose of describing particular embodiments only, and is not intended to limit the scope of the present invention. It must be understood that as used herein and in the appended claims, the singular forms "a," "an," and "the" include the plural reference unless the context clearly dictates otherwise. For example, a reference to "an element" is a reference to one or more elements and includes all equivalents known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Language that may be construed to express approximation should be so understood unless the context clearly dictates otherwise.

Unless defined otherwise, all technical and scientific terms used herein have the same meanings as commonly understood by a person of ordinary skill in the art to which this invention belongs. Preferred methods, techniques, devices, and materials are described. But any methods, techniques, devices, or materials similar or equivalent to those described herein may be used in the practice or testing of the present invention. Structures described herein should also be understood to refer to functional equivalents of such structures.

References to "one embodiment," "one variant," "an embodiment," "a variant," "various embodiments," "numerous variants," etc., may indicate that the embodiment(s) of the invention so described may include particular features, structures, or characteristics. However, not every embodiment or variant necessarily includes the particular features, structures, or characteristics. Further, repeated use of the phrase "in one embodiment," or "in an exemplary embodiment," or "a variant," or "another variant," do not necessarily refer to the same embodiment although they may. A description of an embodiment with several components in communication with each other does not imply that all such components are required. On the contrary, a variety of optional components are described to illustrate the wide variety of possible embodiments and/or variants of the present invention.

As is well known to those skilled in the art, many careful considerations and compromises typically must be made when designing the optimal manufacture or commercial implementation of such a horizontally placed dental implant system and method. A commercial implementation in accordance with the spirit and teachings of the invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art.

Systems will be described and provided with means and methods for providing and implementing a horizontally placed dental implant system and method. The exemplary horizontally placed dental implant system and method will now be described in detail with reference to embodiments thereof as illustrated in the accompanying drawings.

FIG. 1 is a perspective view of an implant body and separate O-ball attachment or abutment in accordance with an embodiment of the invention. The horizontally placed dental implant 100 consists of an implant body 102 and an attachment or abutment 104. Each implant body has a proximal and distal end 106. Each implant body also includes one or more helical threads 108 extending along the outside region between the proximal and distal ends 106. The proximal and distal ends of each implant body can be shaped in various ways conducive to insertion and osseointegration of the implant body 102. In one embodiment of the invention, the proximal and distal ends 106 of the implant body 102 can be truncated. Each implant body includes an internal architecture 110 capable of accommodating a dental implant abutment, a retentive element or dental implant prosthesis. Persons having skill in the art will readily appreciate that the internal architecture 110 can assume numerous shapes and conformations. In the preferred embodiment of the invention, the implant body and attachment or abutment are separate from, but connectable to, one another. Persons skilled in the art will understand that the implant body and attachment or abutment may attach to each other through various means such as, but not limited to, a locking screw mechanism. The screw mechanism can be either a part of the abutment itself, or can be separate from the abutment entirely.

It will become readily apparent to persons having skill in the art that the shape and design of the attachments or abutments 104 illustrated are not all-inclusive. This illustration is but one embodiment of how the invention will attach to and support the denture. There are many other design shapes, connections and weight-bearing features that fall within the scope of the present invention. In this illustration, the attachments or abutments assume a ball configuration to be used in a ball and socket connection. In the preferred embodiment of the invention, the components are made from a noncorrodible, lightweight metal or metal alloy such as titanium or titanium alloys. However, other materials including, but not limited to, metal and metal alloys may be suitable. Other embodiments may include zirconium alloys.

Persons having skill in the art will appreciate that the implant architecture is different than traditional dental implants. In embodiments of the invention, the one or more helical threads 108 may differ from traditional dental implants. In one embodiment of the invention, the proximal and distal ends 106 of the endosteal horizontally placed dental implant system are truncated so as to facilitate the insertion of the one or more implants to be used. Moreover, the shape, width and length of the horizontally placed dental implant system may differ from those of traditional dental implants. More importantly, in one or more embodiments, the internal architecture varies greatly from traditional dental implants as does the manner in which masticatory and excursive forces are experienced and dissipated.

Figure 2:
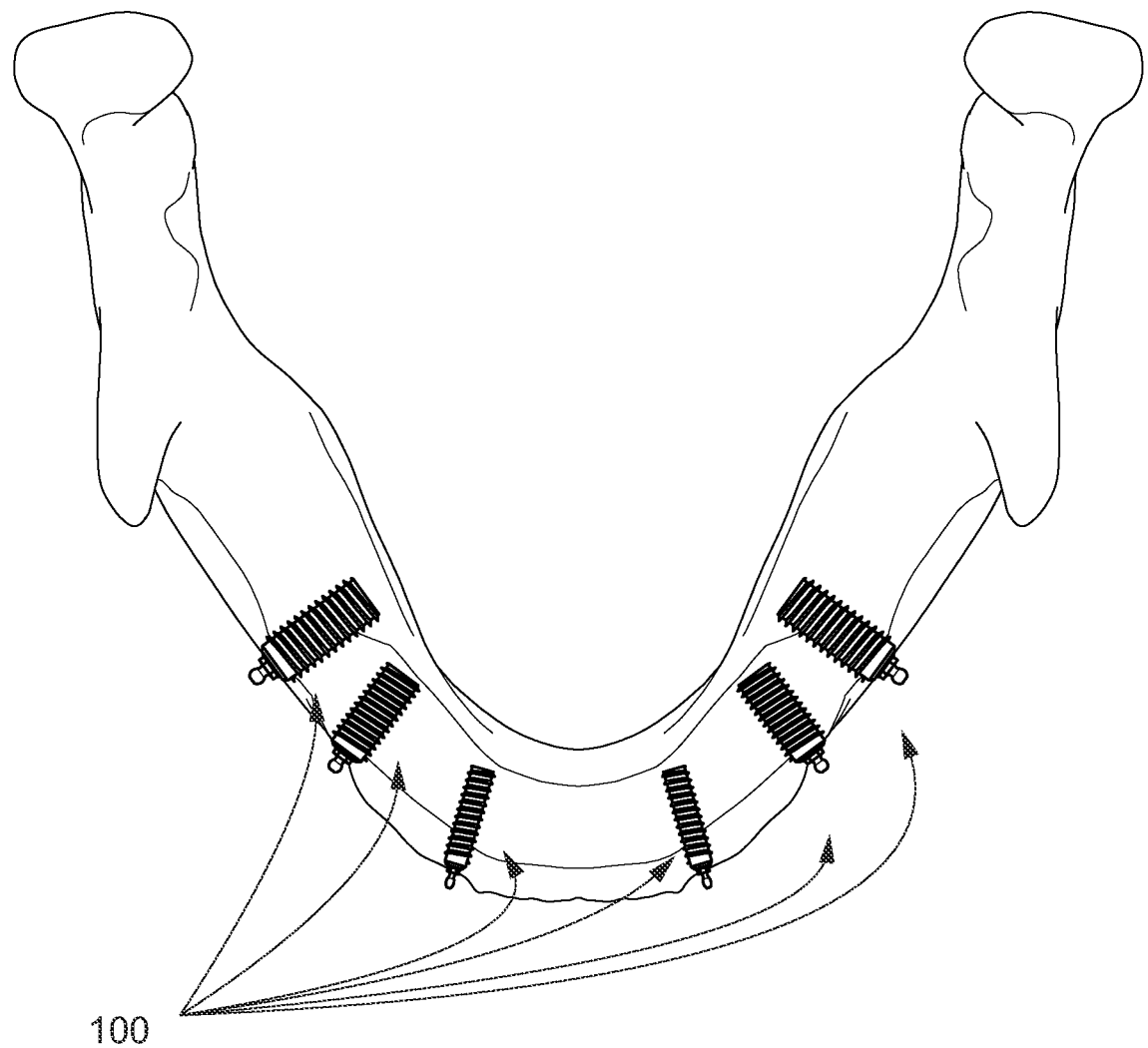
FIG. 2 is a top cutaway view of a mandible with a horizontally placed dental implant system installed in accordance with an embodiment of the invention.
Figure 2:
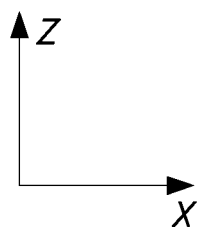

FIG. 2 is a top cutaway view of a mandible with a horizontally placed dental implant system 100 installed in accordance with an embodiment of the invention. In this view, horizontally placed dental implants 100 of varying sizes and depths are shown. Persons having skill in the art will understand that the horizontally placed dental implant system and method may assume numerous sizes and configurations depending on patient need. Persons having skill in the art will further appreciate that horizontally placed dental implants can be placed at varying angles and depths depending on patient need. In embodiments of the invention, one or more implant bodies are configured to be implanted horizontally or near horizontally by way of a non-crestal approach, into a mandible or maxilla and to engage and integrate with bone tissue. For purposes of this application, a non-crestal approach is defined as an implant placement approach from a direction which does not originate from the crest of the ridge, is not vertical or near vertical into the jawbone. The origin of placement is non-crestal. Stated differently, a non-crestal approach is an approach wherein a dental implant is inserted horizontally or near horizontally into a mandible or maxilla from either the buccal side towards the lingual or palatal side or from the lingual or palatal side towards the buccal side at an angle which maximizes engagement with a mandible or maxilla. Persons skilled in the art will appreciate the omnidirectional nature of such a non-crestal approach.

Figure 3A:
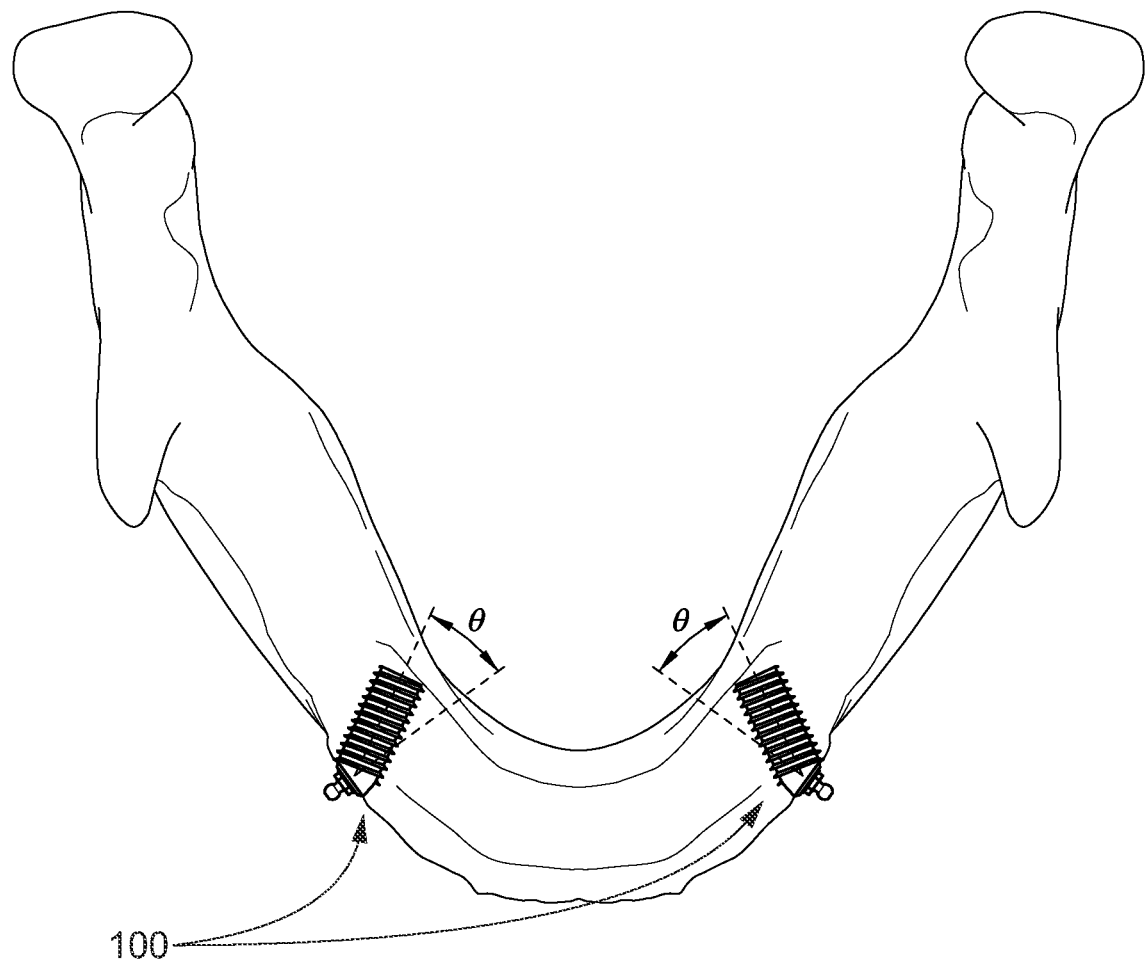
FIG. 3A is a top cutaway view of a mandible with a horizontally placed dental implant system installed in accordance with an alternate embodiment of the invention.

FIG. 3A is a top cutaway view of a mandible with a horizontally placed dental implant system 100 installed in accordance with an alternate embodiment of the invention. In this illustration, the horizontally placed implant system 100 is depicted as entering the mandible or lower jaw from an angular anterior to posterior progression. As the horizontally placed dental implant system is progressing towards the posterior of the mandible, it is also progressing with an angled trajectory as noted by the angle Θ, or theta. In alternative embodiments, the horizontally placed dental implant can progress simultaneously upward or downward and posteriorly into the jawbone or mandible. Such an approach allows for the dentist to utilize an implant which maximizes bone engagement, and may also allow the dentist to utilize an implant with a greater length and/or diameter. This increase in surface area contact with the bone, allows for a stronger, more stable osseointegrated dental implant. A greater implant length may provide for greater strength when used to secure implant supported prostheses. In this view, the proximal ends of the horizontally placed implant is angled. The angle of the proximal end allows for an abutment to be inserted in such a way so as to provide for a denture or prosthesis to be angled.

Figure 3B:
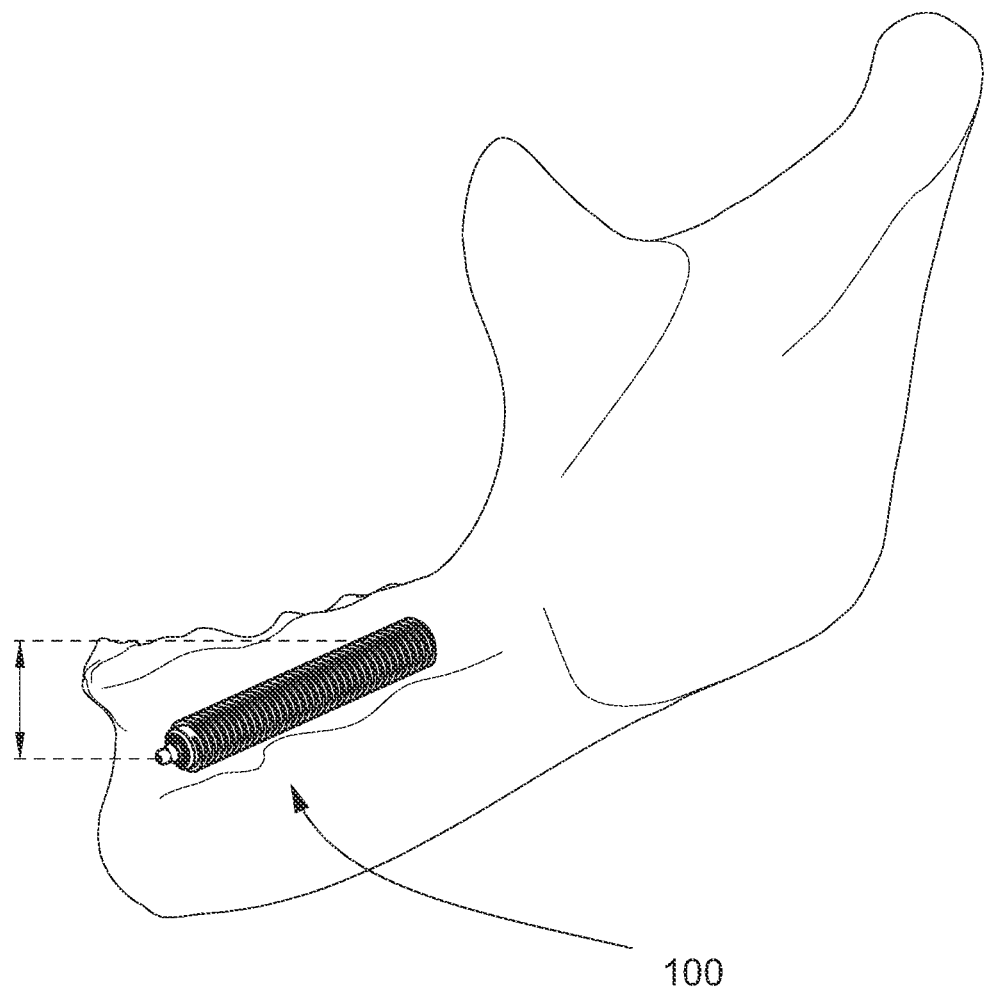
FIG. 3B is a side view of a mandible with a horizontally placed dental implant system installed in accordance with an embodiment of the invention.

FIG. 3B is a side view of a mandible with a horizontally placed dental implant system 100 installed in accordance with an alternate embodiment of the invention. In this illustration, the horizontally placed implant system 100 is depicted as entering the mandible or lower jaw from an anterior to posterior progression. As the horizontally placed dental implant system is progressing towards the posterior of the mandible, it is also progressing with a rising trajectory. In other words, the horizontally placed dental implant is progressing upward into the jawbone or mandible. Such an approach allows for the use of a greater implant length and or width. A greater implant length and/or width may provide for greater strength when used to secure dentures; this would for all intents and purposes be next to impossible to accomplish on a patient with compromised bone volume using conventionally placed dental implants. It must be understood that the angle of entry and the length of the horizontally placed dental implant can and will vary depending on patient need.

Figure 4:
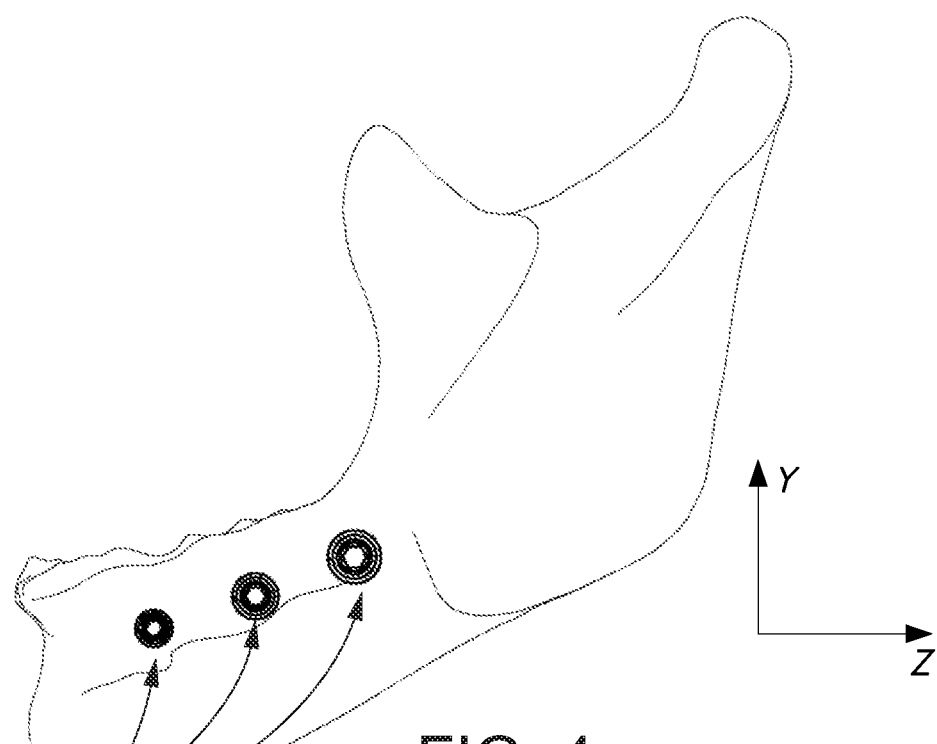
FIG. 4 is a side view of a mandible with a horizontally placed dental implant system installed in accordance with an embodiment of the invention.

FIG. 4 is a side view of a mandible with a horizontally placed dental implant system 100 installed in accordance with an embodiment of the invention. In this view, horizontally placed dental implants of varying sizes and widths are shown. Persons having skill in the art will understand that the horizontally placed dental implant system and method may assume numerous sizes and configurations depending on patient need.

Figure 5:
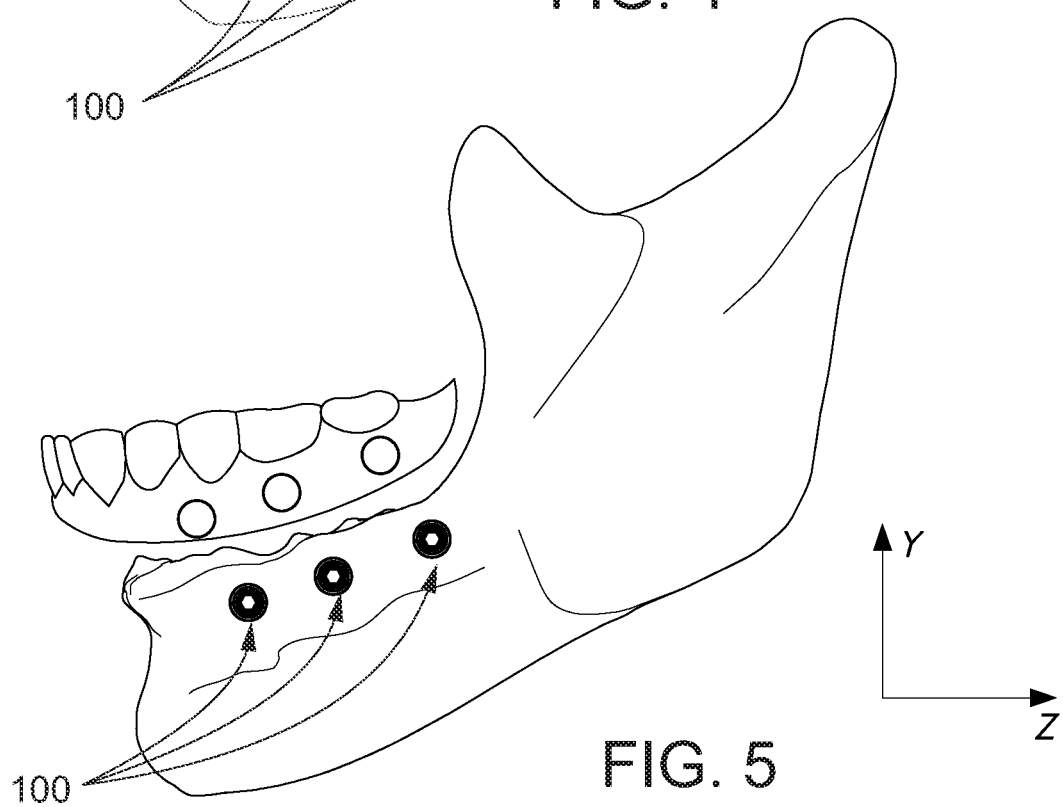
FIG. 5 is a side view of a mandible with a horizontally placed dental implant system installed in accordance with an alternate embodiment of the invention.

FIG. 5 is a side view of a mandible with a horizontally placed dental implant system 100 installed in accordance with an alternate embodiment of the invention. In this view, horizontally placed dental implants of the same size and widths are shown. Persons having skill in the art will understand that the horizontally placed dental implant system and method may assume numerous sizes and configurations depending on patient need.

Figure 6:
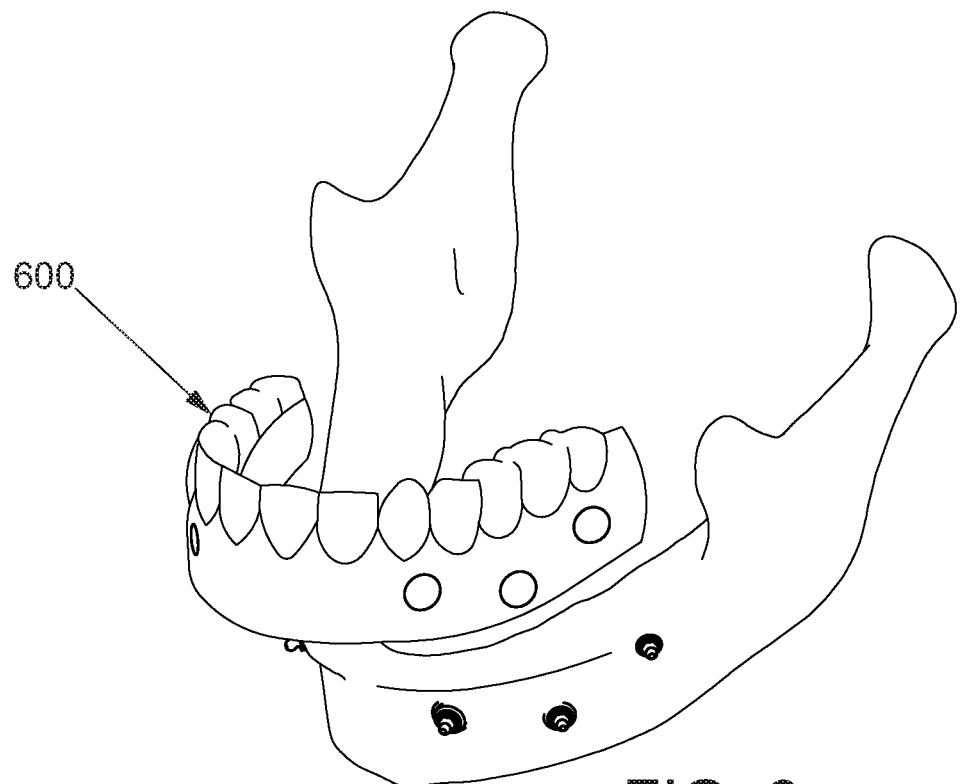
FIG. 6 is a perspective view of a mandible with a horizontally placed dental implant system and a denture assembly in accordance with an embodiment of the invention.

FIG. 6 is a perspective view of a mandible with a horizontally placed dental implant system and a denture assembly 600 in accordance with an embodiment of the invention. In this view, the abutments are acting as the retentive element. Such abutments are known as O-ball abutments, which are commonly used in implant retained dentures. In embodiments of the invention, dentures can refer to both partial and full dentures. In this view, the corresponding circles in the denture assembly can be female attachments or any suitable attachment which engages with the O-ball abutment. Persons having skill in the art will appreciate that many other abutments and attachments can be used to attach such a denture assembly.

Figure 7:
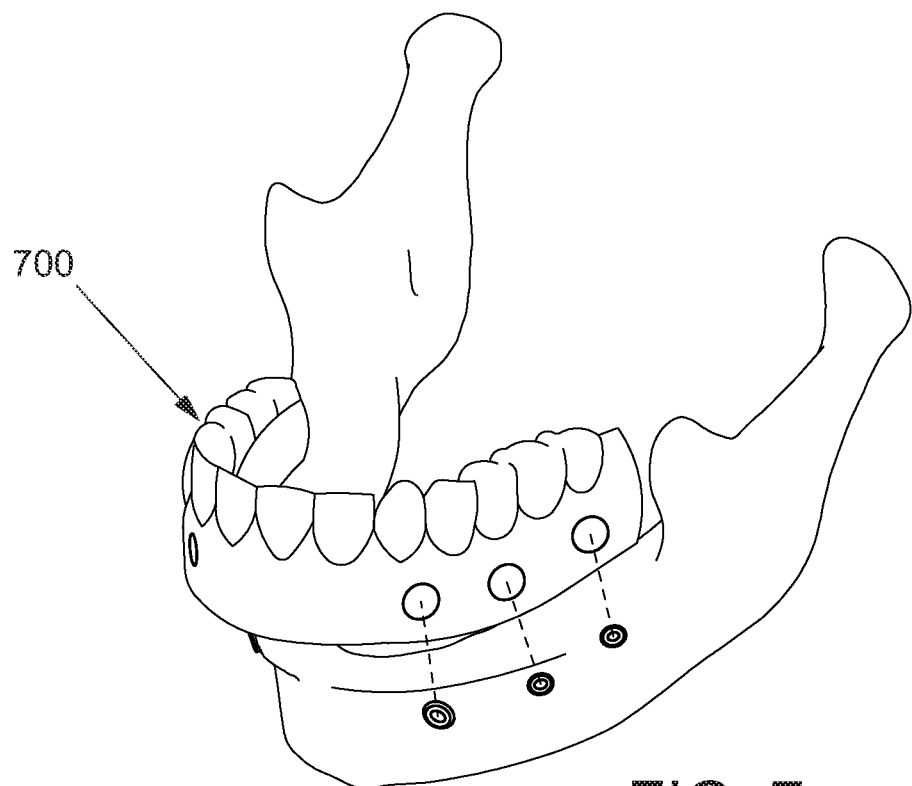
FIG. 7 is a perspective view of a mandible with a horizontally placed dental implant system and a denture assembly in accordance with an embodiment of the invention.

FIG. 7 is a perspective view of a mandible with a horizontally placed dental implant system and a denture assembly 700 in accordance with an embodiment of the invention. In this view, the abutments are acting as the retentive element. Persons having skill in the art will readily appreciate that the arrangement of dental implants and abutments can assume different conformations such as, but not limited to, a linear pattern. FIG. 7 also illustrates that the horizontally placed implants are without a visible attachment or abutment. This is intended to show that the implant can also serve as a receptacle for a retentive element which may be inserted into the horizontal implant to retain the prosthesis. In other words, at least one dental implant includes an orifice in its internal architecture to act as the female component to a male retentive element or abutment. The retentive element may emanate from the denture attachment apparatus, or may be inserted as an individual retentive element through the denture and attaching in or to the implant. Persons having skill in the art will understand that the number, shape, and conformation of implants and abutments vary depending on patient physiology and need. In embodiments of the invention, dentures can refer to both partial and full dentures. In this view, the corresponding circles in the denture assembly can be female attachments or any suitable attachment which engages with the retentive element, abutment, or the implant itself. Persons having skill in the art will appreciate that other retentive elements, abutments and/or attachments can be used to attach such a denture assembly.

Figure 8:
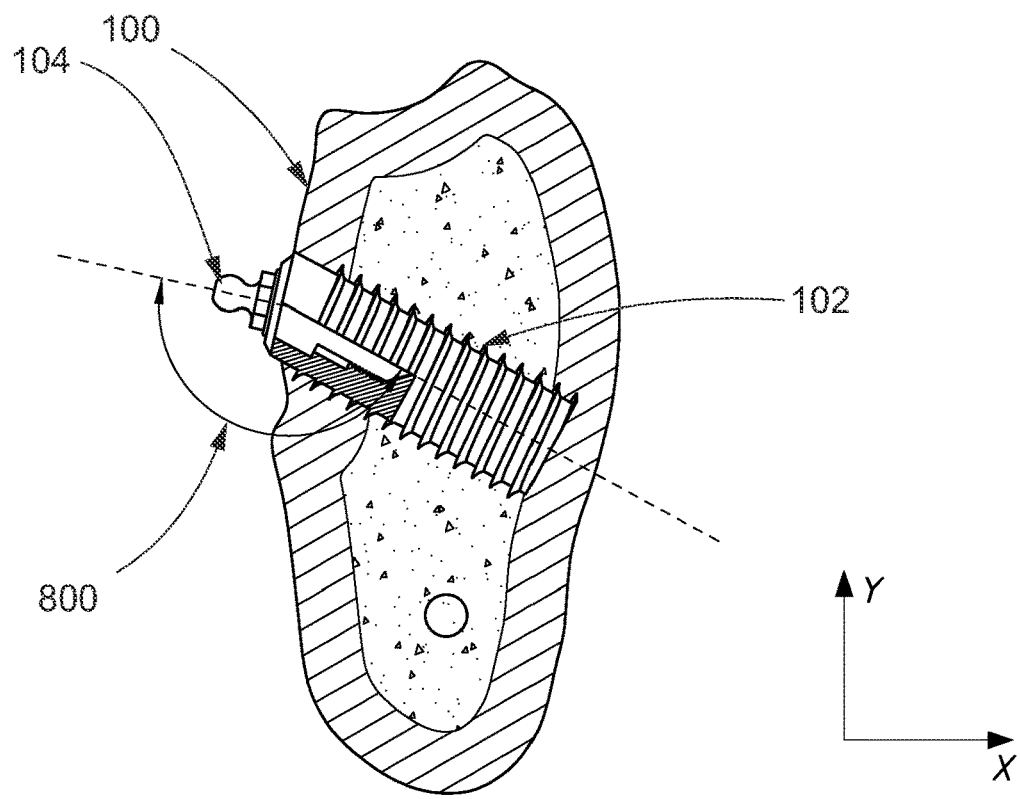
FIG. 8 is a cross sectional illustration of a mandible with a horizontally placed dental implant system in accordance with an embodiment of the invention.

FIG. 8 is a cross sectional illustration of a mandible with a horizontally placed dental implant system 100 in accordance with an embodiment of the invention. In this view, the implant 102 is inserted at an angle originating from the buccal (cheek) side toward the lingual (tongue) side. The implant 102 originates from a higher elevation than the apex of the implant 102. In other words, the insertion begins higher, progresses into the bone, and progresses downward into the bone. Such an approach allows for the dentist to engage a greater volume of bone, and may also allow the dentist to utilize an implant with a greater length and/or diameter. This increase in surface area contact with the bone, allows for a stronger osseointegrated dental implant. In this view, the attachment or abutment 104 may be positioned at an angle 800 neither parallel with nor perpendicular to the implant 102. Persons having skill in the art will appreciate that attachments or abutments 104 may be angled according to patient needs.

Figure 9:
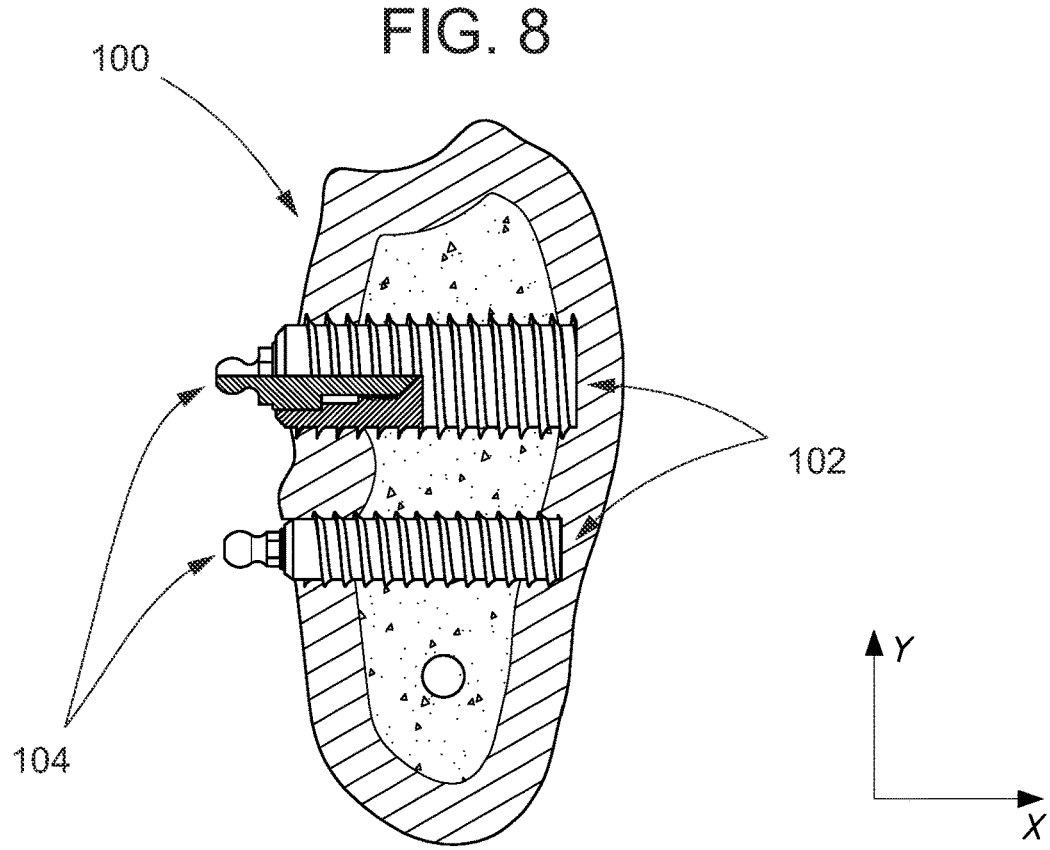
FIG. 9 is a cross sectional illustration of a jawbone with a horizontally placed dental implant system in accordance with an alternative embodiment of the invention.

FIG. 9 is a cross sectional illustration of a mandible with a horizontally placed dental implant system 100 in accordance with an alternative embodiment of the invention. In this view, the implant 102 is inserted originating from the buccal (cheek) side toward the lingual (tongue) side. The implant 102 originates from an elevation as the apex of the implant 102. In other words, the implant 102 is inserted and progresses from the cheek side, toward the tongue/lingual side of the bone, and remains perpendicular to the bone. In an embodiment of the invention, the attachment or abutment 104 may be positioned at an angle parallel with the implant 102. Persons having skill in the art will appreciate that attachments or abutments 104 may be angled according to patient needs.

Figure 10:
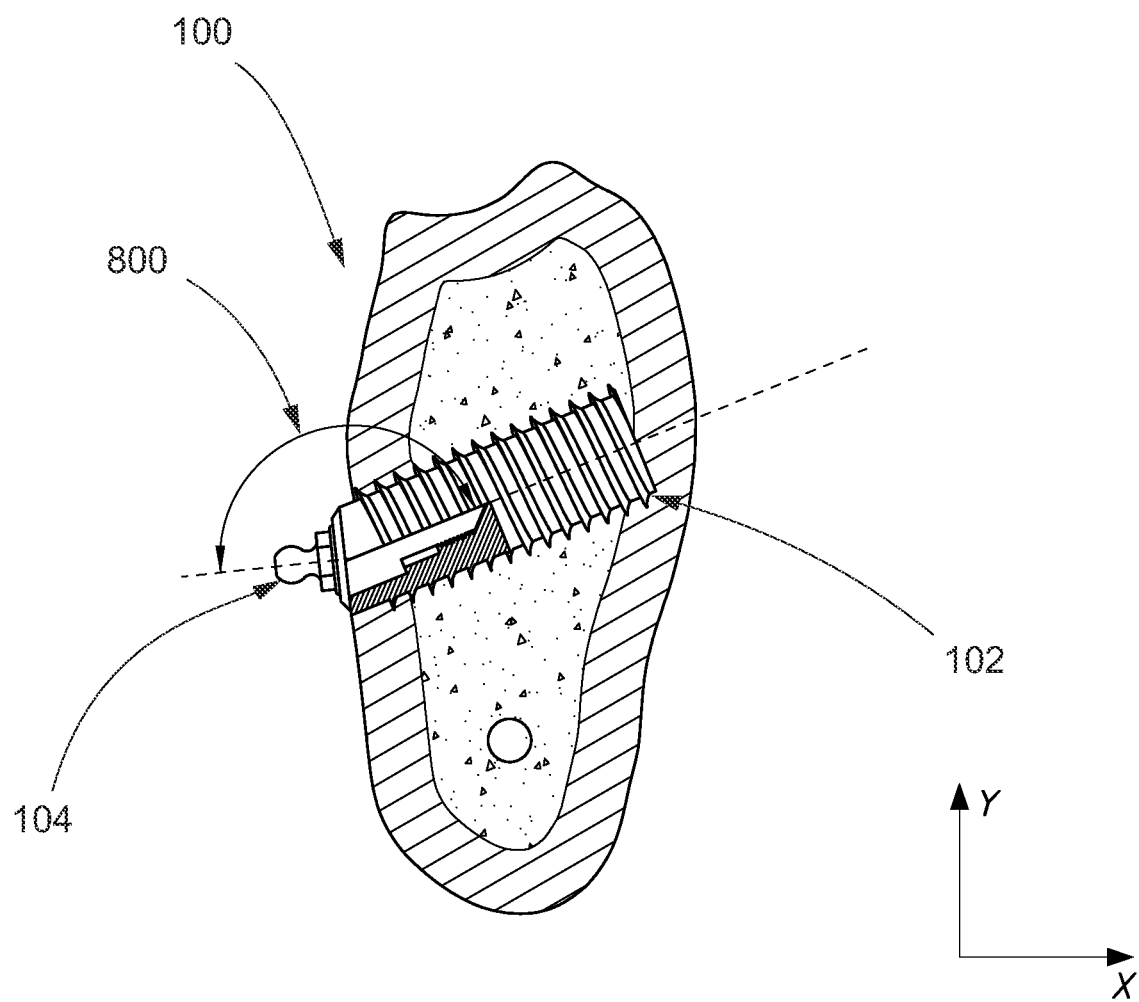
FIG. 10 is a cross sectional illustration of a jawbone with a horizontally placed dental implant system in accordance with an alternative embodiment of the invention.

FIG. 10 is a cross sectional illustration of a mandible with a horizontally placed dental implant system 100 in accordance with an alternative embodiment of the invention. In this view, the implant 102 is inserted at an angle originating from the buccal (cheek) side toward the lingual (tongue) side. The implant 102 originates from a lower elevation than the apex of the implant 102. In other words, the insertion begins at a lower elevation, progresses into the bone, and progresses upward into the bone. Such an approach allows for the dentist to engage a greater volume of bone, and may also allow the dentist to utilize an implant with a greater length and/or diameter. This increase in surface area contact with the bone, allows for a stronger osseointegrated dental implant. In this view, the attachment or abutment 104 may be positioned at an angle 800 neither parallel with nor perpendicular to the implant 102. The angle 800 may vary depending on a patient's anatomical and/or physiological needs. Persons having skill in the art will appreciate that attachments or abutments 104 may be angled according to patient needs.

Figure 11:
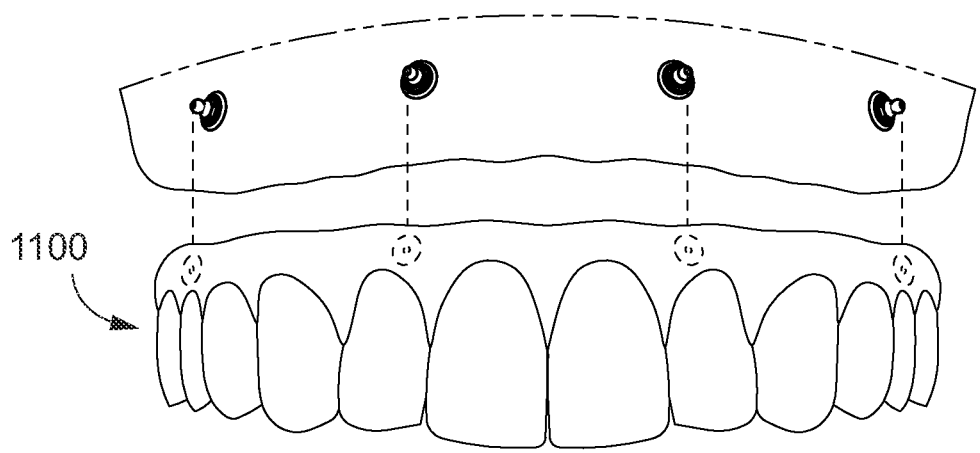
FIG. 11 is a front view of a maxilla with a horizontally placed dental implant system and O-ball abutments installed in accordance with an embodiment of the invention.

FIG. 11 is a front view of a maxilla with a horizontally placed dental implant system installed in accordance with an embodiment of the invention. The illustration shows the upper jaw or maxilla with four O-ball abutments which are attached to the implants. It also shows the upper denture 1100 with "female" attachments on the inside of the denture. In other words, such denture attachments may not be visible from the outside. When the denture is seated, the denture is secured when the O-ball abutment and its female counterpart connect. Persons having skill in the art will understand that such an abutment may be configured to connect with a denture in numerous ways so as to provide a patient a retentive, functional denture.

Figure 12:
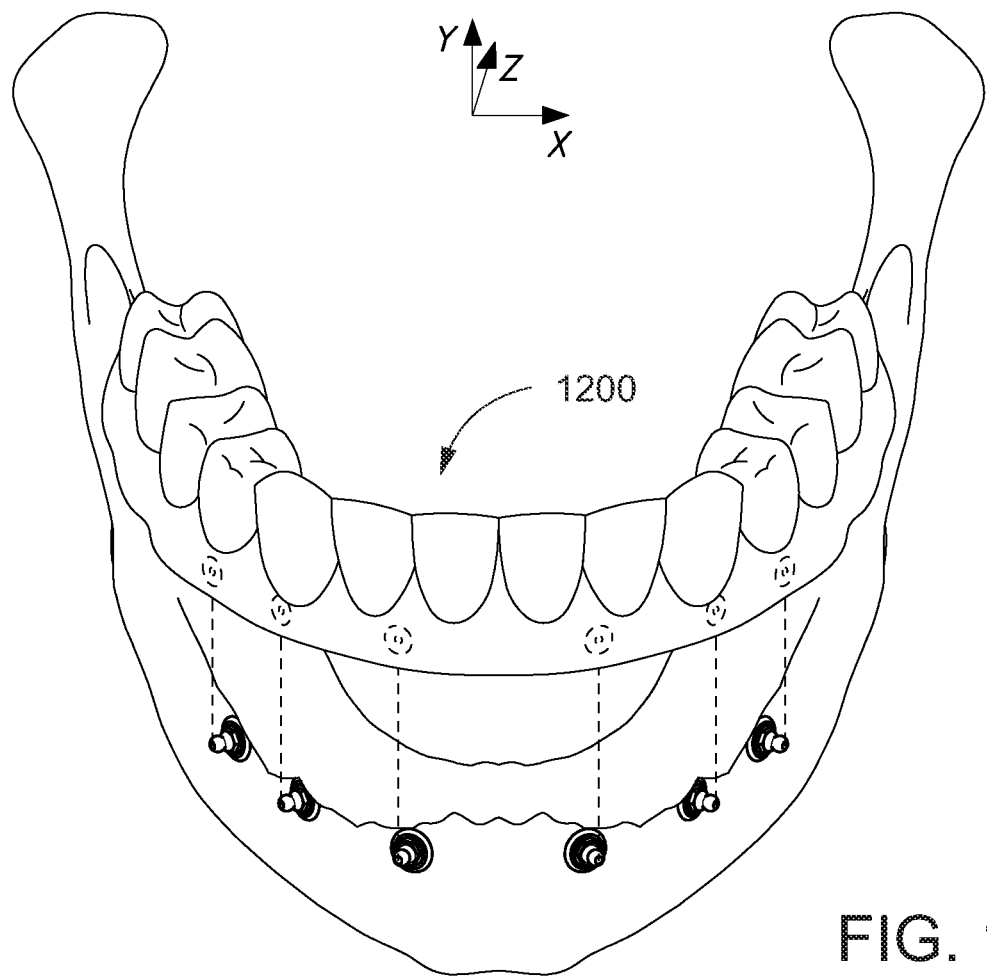
FIG. 12 is a front perspective view of a mandible with a horizontally placed dental implant system and O-ball abutments installed in accordance with an embodiment of the invention.

FIG. 12 is a front view of a mandible with a horizontally placed dental implant system installed in accordance with an embodiment of the invention. The illustration shows the lower jaw or mandible with 6 O-ball abutments which are attached to the implants. The illustration further shows a lower denture 1200 with "female" attachments on the inside of the denture. In other words, such denture attachments may not be visible from the outside. When the denture is seated, the denture is secured when the O-ball abutment and its female counterpart connect. Persons having skill in the art will understand that such an abutment may be configured to connect with a denture in numerous ways so as to provide a patient a functional denture.

Figure 13:
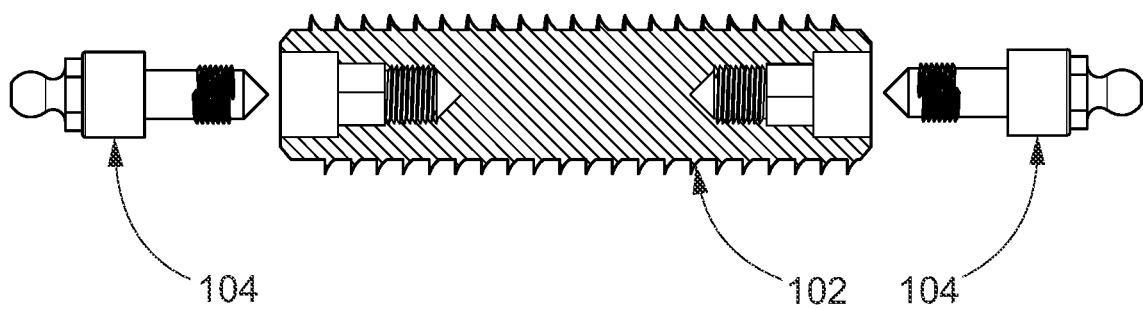
FIG. 13 is a side sectional view of an implant body and abutment in accordance with embodiments of the invention.

FIG. 13 is a side sectional view of an implant body and abutment in accordance with embodiments of the invention. In an embodiment of the invention, the implant body is configured to be implanted horizontally or near horizontally by way of a non-crestal approach, into a mandible or maxilla and to engage and integrate with bone tissue. For purposes of this application, a non-crestal approach is defined as an approach from a direction which is not vertical or near vertical into the jawbone. Stated differently, a non-crestal approach is an approach wherein a dental implant is inserted horizontally or near horizontally at into a mandible or maxilla from either the buccal side towards the lingual side or from the lingual side towards the buccal side at an angle which maximizes engagement with a mandible or maxilla. In this view, an implant with dual internal access slots at each end of the implant are shown. The diagram illustrates two identical attachments or abutments 104. Persons having skill in the art will understand and appreciate that attachments or elements can be used in lieu of the term abutment. Such a unique attribute allows for multiple abutments, or other retentive elements or prosthetic elements to be utilized on a single implant fixture 102. In this view, the two attachments or abutments are of a ball configuration to be used in a ball and socket connection. However, other attachments or abutments or retentive elements can be employed. In embodiments of the invention, utilization of one or both access slots is optional. A clinician may choose to use either slot or both slots. This feature offers unprecedented versatility in prosthetic design options. The implant can have one orifice or multiple orifices, in which the prosthetic parts may engage the implant. The placement of a bi-orifice implant does not necessarily dictate that both orifices must be utilized. The orifice which is not in use may be "capped" or covered by a cover screw or cover plate or cover fixture.

Figure 14:
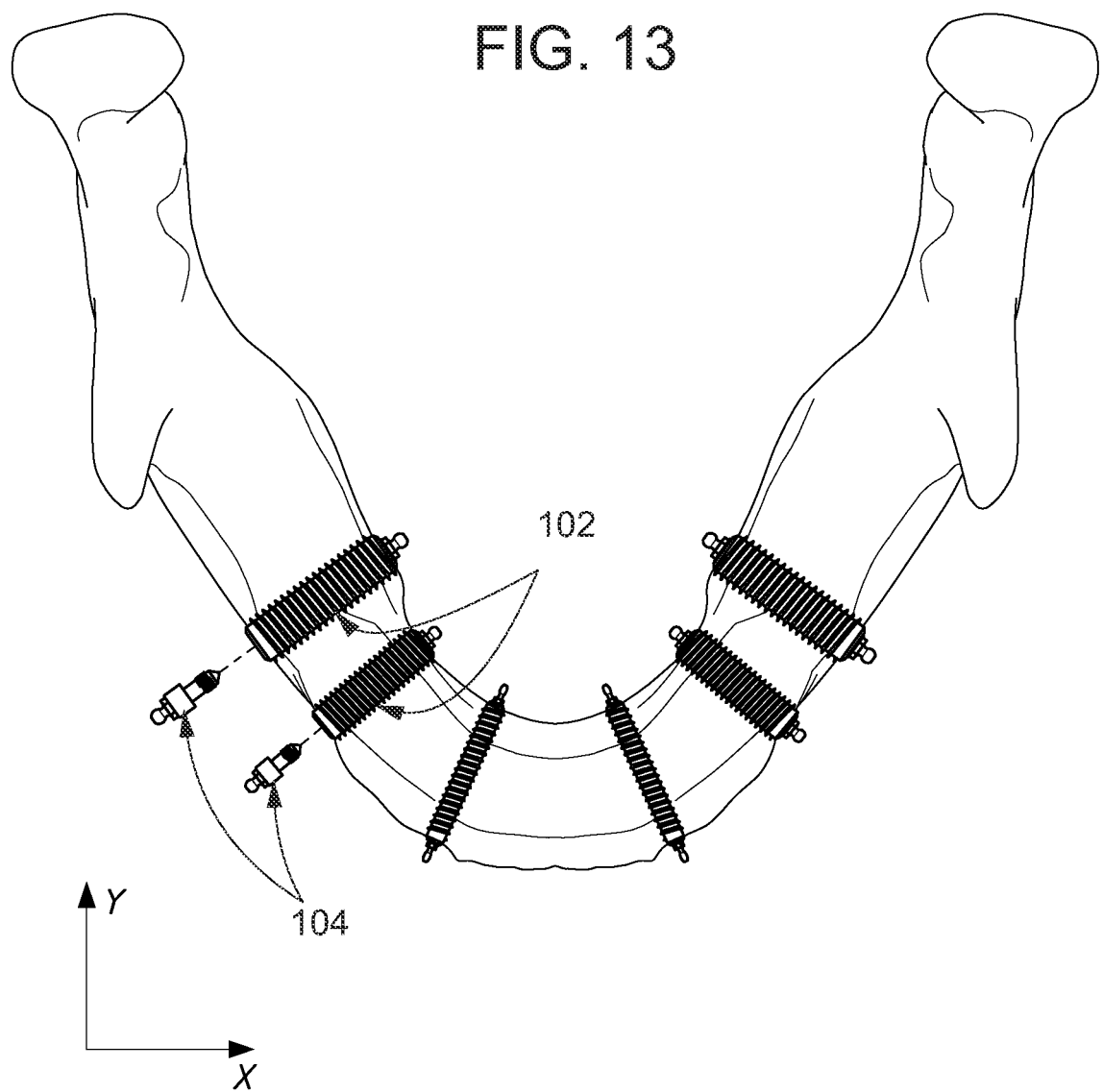
FIG. 14 is a top cutaway view of a mandible with a horizontally placed dental implant system installed in accordance with an embodiment of the invention.

FIG. 14 is a top cutaway view of a mandible with a horizontally placed dental implant system installed in accordance with an alternative embodiment of the invention which shows abutments being utilized on both ends of the implant. In this view, horizontally placed dental implants 100 of varying sizes and depths are shown. Persons having skill in the art will understand that the horizontally placed dental implant system and method may assume numerous sizes and configurations depending on patient need. The attachments or abutments 104 may be attached by various means known in the art.

Figure 15:
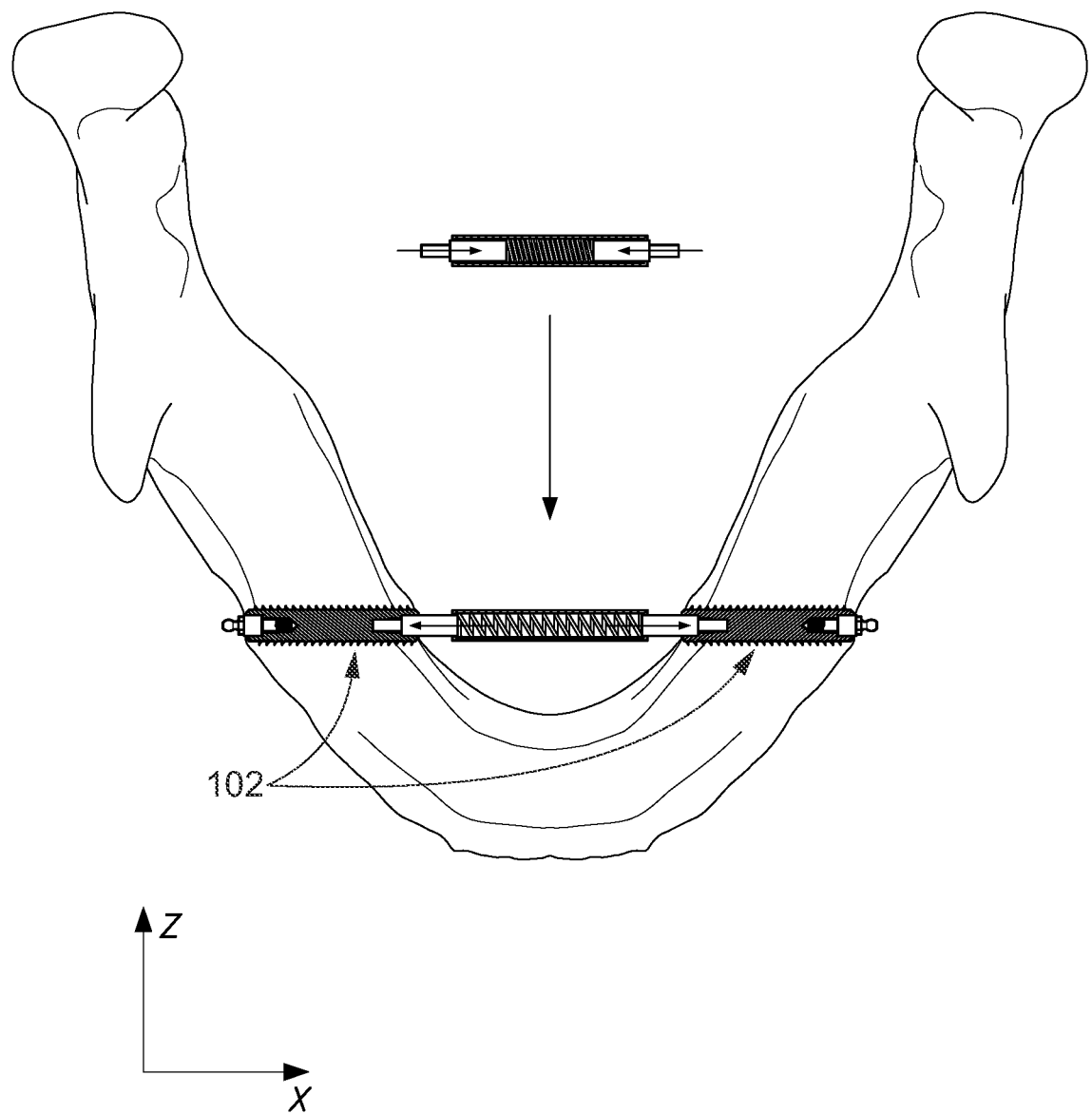
FIG. 15 is a top cutaway view of a mandible with a horizontally placed dental implant system installed in accordance with an embodiment of the invention.

FIG. 15 is a top cutaway view of a mandible with a horizontally placed dental implant system installed in accordance with an alternative embodiment of the invention. In this view, two horizontally placed implants 102 are shown with dual internal access slots, one at each end of the implant. A cylindrical retentive bar engages the internal access slot of each implant. In such an embodiment, the cylindrical bar may include a spring action. When pressure is applied to the cylindrical bar, it contracts. Such contraction facilitates the process of insertion and removal of the retentive bar. When pressure is released from the cylindrical bar, it may return to its original configuration and engage the access slot in the implant 102.

Figure 16:
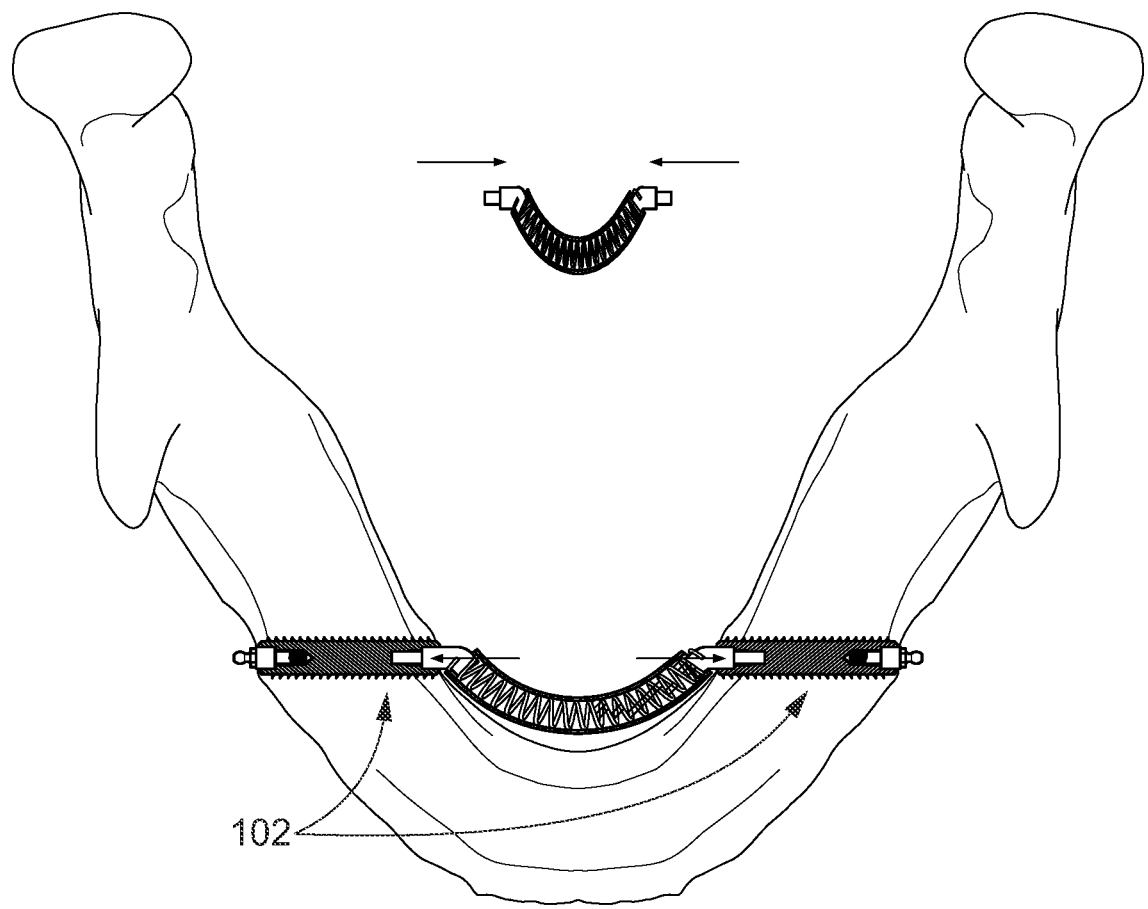
FIG. 16 is a top cutaway view of a mandible with a horizontally placed dental implant system installed in accordance with an embodiment of the invention.
Figure 16:
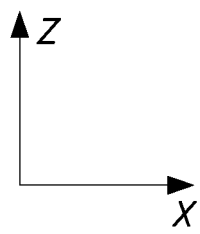

FIG. 16 is a top cutaway view of a mandible with a horizontally placed dental implant system installed in accordance with an alternative embodiment of the invention. In this view, a similar spring mechanism as shown in FIG. 15, except in this illustration a curved, cylindrical retentive bar is employed. Such contraction facilitates the process of insertion and removal of the retentive bar.

Figure 17:
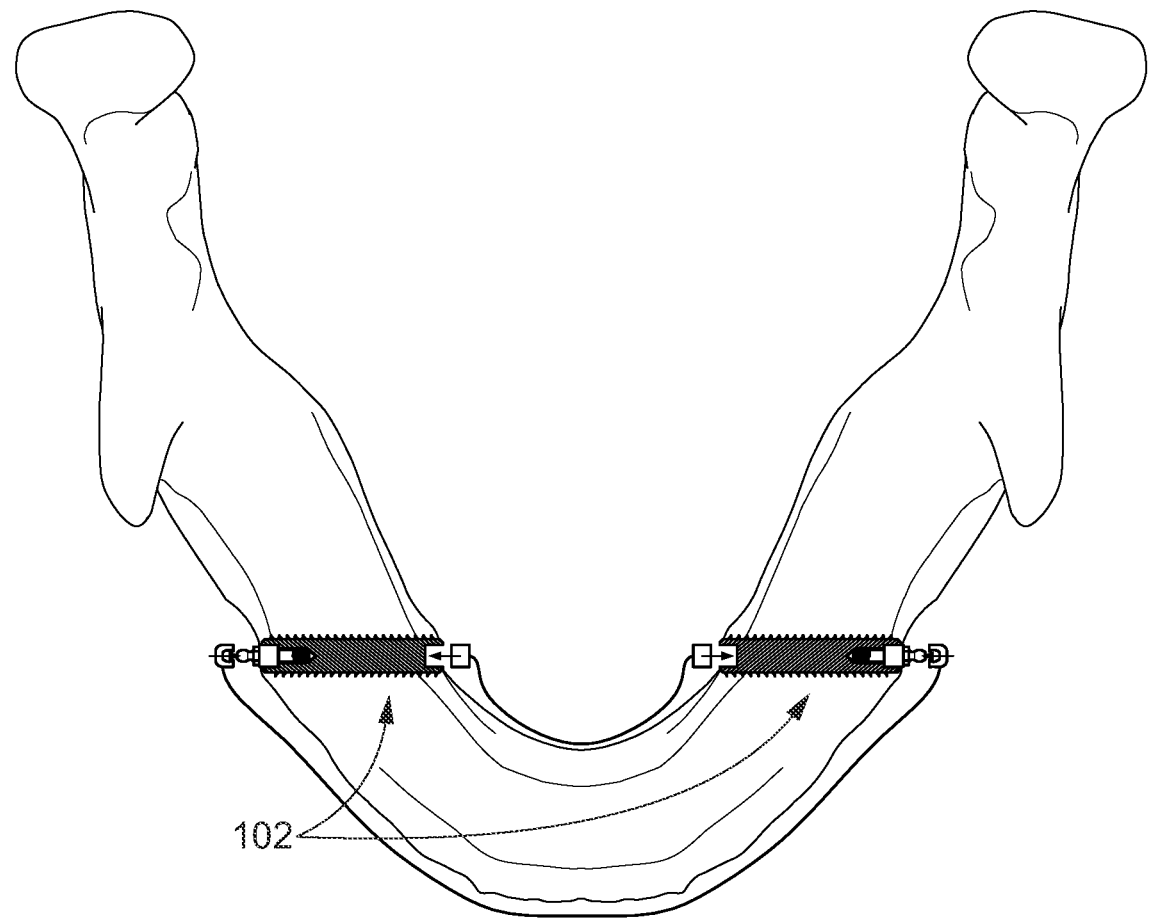
FIG. 17 is a top cutaway view of a mandible with a horizontally placed dental implant system installed in accordance with an embodiment of the invention.
Figure 17:
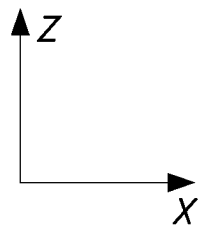

FIG. 17 is a top cutaway view of a mandible with a horizontally placed dental implant system installed in accordance with an alternative embodiment of the invention. In this view, two horizontally placed implants 102 are shown with dual internal access slots, one at each end of the dental implant. In this view, two separate retentive bars are shown, each retentive bar may be individually utilized (one without the other) or simultaneously utilized in unison. Each retentive coil or bar is shown on both the cheek/buccal and tongue/lingual sides of the mandible.

Figure 18:
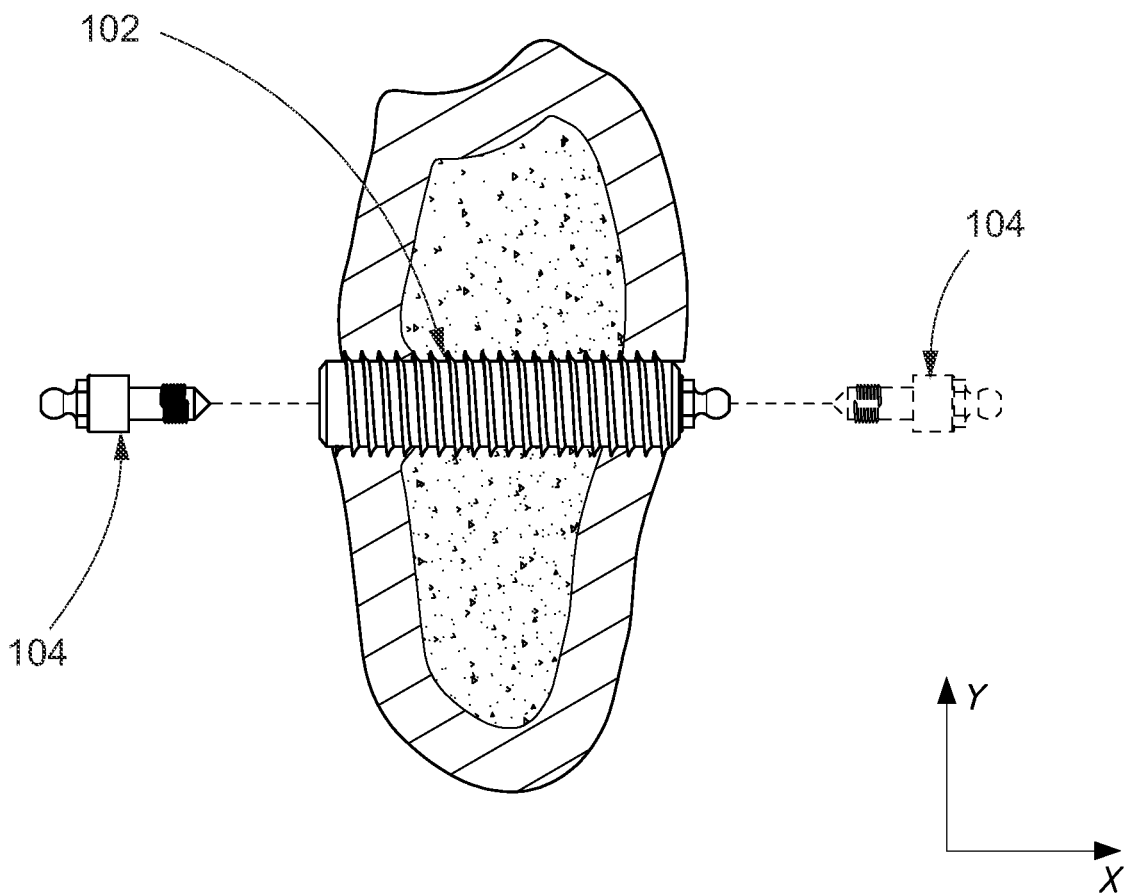
FIG. 18 is a cross sectional illustration of a jawbone with a horizontally placed dental implant system in accordance with an embodiment of the invention.

FIG. 18 is a cross sectional illustration of a jawbone with a horizontally placed dental implant system in accordance with an alternative embodiment of the invention. In this view, the implant 102 is positioned through the bone. Dual internal access slots provide for attachments or abutments 104, which may be positioned on both sides of the bone. Persons having skill in the art will appreciate that attachments or abutments 104 may be angled according to patient needs.

Figure 19:
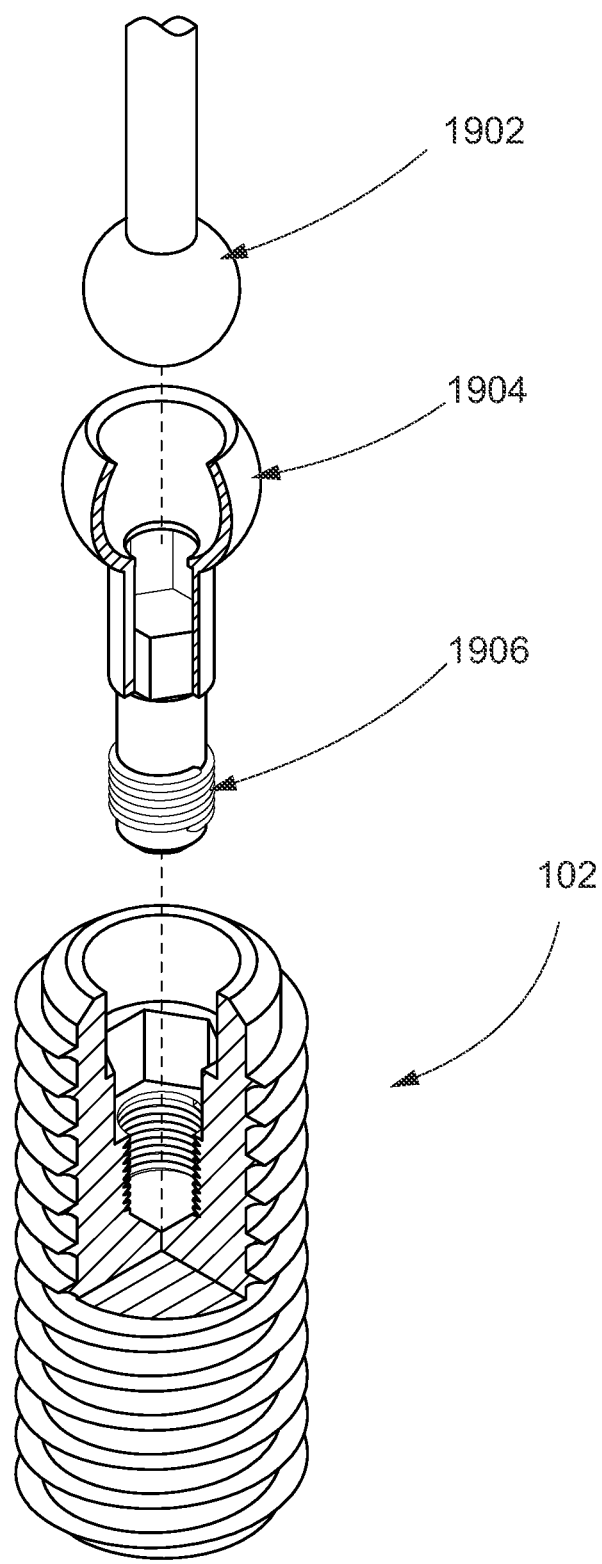
FIG. 19 is a perspective sectional view of an implant body and separate ball and socket attachment or abutment in accordance with an embodiment of the invention.

FIG. 19 is a perspective sectional view of an implant body and separate ball and socket attachment or abutment in accordance with embodiments of the invention. In such an embodiment, the horizontal implant fixture has an internal architecture that extends for a large portion of the length of the implant. Internal architecture of the endosteal horizontal implant will vary greatly among the different embodiments; length, structure, shape and design. In such an embodiment, an o-ball retentive abutment bar 1902 may be threaded through a horizontal implant. Other retentive elements 1902 known and appreciated in the art can be used. Once threaded through the implant 102 O-ball attachments or abutments 1904 may be threaded over the ends of the abutment bar or retentive element 1902. Use of the second slot or orifice may be optional. When only one slot or orifice is used, the other remaining slot or orifice may be covered by a cover cap known in the art. In an embodiment of the invention, the O-ball female receiver 1904 connects to the implant fixture 102 by a retainer screw mechanism employing a retainer screw 1906. In another embodiment, the O-ball female receiver 1904 may be manufactured in unison with the implant fixture 102 creating a one piece unit without the need for a retainer screw attachment means. In another embodiment of the invention, the O-ball attachments or any retentive element or abutment can rotate freely on all planes, capable of 360 degree rotation, or any degree that need be achieved to provide a specific retentive purpose, and to provide virtually unlimited angles for the attachment of dentures, retentive elements, or other abutments. In such embodiments, the denture appliance may have a circular, oval, hexagonal, octagonal or other shaped hardware piece which may allow the O-ball retentive abutment bar 1902 to extend from or through the hardware piece on the denture ultimately connecting with the O-ball female connector 1104.

In one embodiment of the invention where the retentive element and the implant are already together; the retentive element, while it is within the confines of the implant, can also be used as the receptacle for a dental implant placement tool. Thus, the retentive element (or abutment, or retentive abutment) may serve more than one purpose; it may be used as the medium that the implant placement tool engages to place the implant, as well as the retentive element. By way of example, and not limitation, a clinician can engage the implant with the placement tool, the implant will be placed into the jawbone until the desired depth (the retentive element is still wholly within the confines of the implant). After osseointegration (3-4 months later, sometimes longer), the retentive element or abutment can be "activated" to protrude from within the implant whereby it is now "usable" for prosthetic retention.

In another embodiment of the invention, the patient's denture would have a receptacle for the retentive element which is emerging from the horizontal implant. The retentive attachment apparatus instead of a complementary access hole. The retentive attachment apparatus would also line up with the horizontal implant. The retentive attachment apparatus may be located within the denture wall or flange. A patient will then mechanically activate the retentive attachment apparatus mechanically via mechanical or rotational forces. In other embodiments, the retentive attachment apparatus may be activated via a push in-pull out mechanism, or a lateral force, or any other directional force needed to engage or activate the retentive mechanism.

FIG. 20A is a front view of a lateral edge of the horizontally placed implant system in accordance with an embodiment of the invention. In this view, it is assumed that the horizontally placed dental implant has been installed into the jawbone and has osseointegrated with the jawbone, and that the abutment is attachable to the horizontally placed implant. What is shown is the area of the dental implant embedded in the bone surface from where the implant end or ends are exposed and where implant abutments can attach. In this view, the space inside the horizontally placed implant assumes a hexagonal shape. Such a hexagonal shape allows for the precise fitting of abutments and other retentive elements.

FIG. 20B is a side sectional view of a lateral edge of the horizontally placed implant system in accordance with an embodiment of the invention. In this view, it is assumed that the horizontally placed dental implant has been installed into the jawbone and has osseointegrated with the jawbone, and that the abutment is attachable to the horizontally placed implant. The most lateral surface of the implant end is where implant abutments, retentive elements, or any accessory attachment piece can attach. In this view, the broken lines illustrate the internal space in the horizontal placed dental implant. Persons having skill in the art will appreciate that many different architectural designs of the horizontal implant itself, as well as its internal architecture can be created. It must be understood that the endosteal horizontally placed non crestal implant system is not to be limited to any physical shape or diameter. There are a multitude of designs too many to mention which are suitable to meet a patient's anatomical and/or physiological needs.

FIG. 20C is a side sectional view of a lateral edge of the horizontally placed implant system in accordance with an embodiment of the invention. In this view, it is assumed that the horizontally placed dental implant has been installed into the jawbone and has osseointegrated with the jawbone, and that the abutment is attachable to the horizontally placed implant. What is shown is the area of the dental implant embedded in the bone. The most lateral surface of the implant end is where implant abutments, retentive elements, or any accessory attachment piece can attach. In this view, the broken lines illustrate the internal space in the horizontal placed dental implant. Persons having skill in the art will appreciate that many different architectural designs of the horizontal implant itself, as well as its internal space. In this view, a retentive element or abutment 2000 is engaged with the horizontally placed dental implant. Persons having skill in the art will understand that the retentive element or abutment can be separate from the horizontal implant as well as the prosthesis or denture. Persons having skill in the art will further understand that a retentive element or abutment can emanate from the prosthesis or implant as well. Finally, the retentive element or abutment can be placed within the horizontal implant first, and then engage with a retentive mechanism fixed in the prosthesis or denture.

In varying embodiments of the invention, the retentive element can have the capability of being "spring loaded" with rotational capabilities within the internal walls of the implant body itself. Persons having skill in the art will readily appreciate that the endosteal horizontally placed non-crestal implant system is configurable to accommodate retentive elements and abutments of varying design and function. By way of example, but not limitation, a retentive element 2000 may be entirely located within the confines of the implant body. The retentive element or abutment may be wholly submerged within the horizontal implant. The retentive element can be designed in such a way that the most exterior surface area of the retentive element can accommodate a placement tool used to place a horizontal implant into the jawbone.

Typically, dental implants are left to osseointegrate into the jawbone for at least three to four months prior to load-bearing use. However, based upon the number of implants placed, the density of bone, the amount of retention desired, the length and surface area of the implants as well as the amount of torque in Newton centimeters the implants have been placed with, the clinician may choose an "immediate-load" use of the implants. In an "immediate-load" scenario, it is exactly as stated, the implants are subject to weight-bearing and forces immediately upon placement without any osseointegration period.

When the time does come to engage the horizontal implant to load bearing use, whether it be after waiting 3-4 months for osseointegration or immediately after placement, the retentive element is activated, and it extends from the confines of the horizontal implant into the oral cavity. The activation mechanism can be accomplished in many ways such as, but not limited to, counterclockwise rotation, depressing and rotation, via a special tool, or by any force, in any direction, or by any mechanical means possible.

Figure 21A:
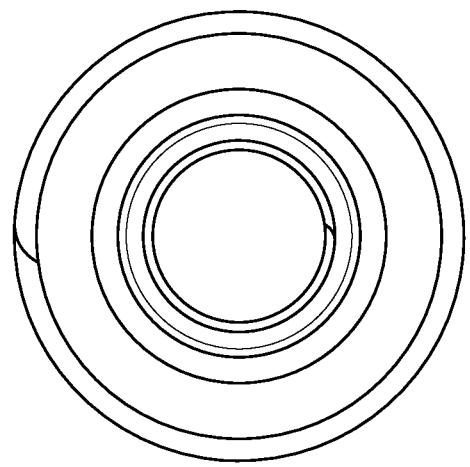
FIG. 21A is a front view of an abutment of the horizontally placed implant system in accordance with an embodiment of the invention.

FIG. 21A is a front view of a lateral edge of the horizontally placed implant system in accordance with an embodiment of the invention. In this view, it is assumed that the horizontally placed dental implant has been installed into the jawbone and has osseointegrated with the jawbone, and that the abutment is attachable to the horizontally placed implant. What is shown is the area of the dental implant embedded in the bone. The most lateral surface of the implant end is where implant abutments, retentive elements, or any accessory attachment piece can attach.

Figure 21B:
FIG. 21B is a side sectional view of an abutment of the horizontally placed implant system in accordance with an embodiment of the invention.

FIG. 21B is a side sectional view of a lateral edge of the horizontally placed implant system in accordance with an embodiment of the invention. In this view, it is assumed that the horizontally placed dental implant has been installed into the jawbone and has osseointegrated with the jawbone, and that the abutment is attachable to the horizontally placed implant. The most lateral surface of the implant end is where implant abutments, retentive elements, or any accessory attachment piece can attach. In this view, the broken lines illustrate the internal space in the horizontal placed dental implant. Persons having skill in the art will appreciate that many different architectural designs of the horizontal implant itself, as well as its internal space. In embodiments of the invention, the horizontal implant will have an orifice exposed to the oral cavity, which will be ready to accept the abutment or retentive element. A patient's denture would have a complementary access hole that correlates and lines up with the horizontal implant orifice. The patient can take the retentive element, which is separate from both the horizontal implant and the prosthesis, and insert it through the side of the denture and continuing into the corresponding horizontal implant. A patient can then either rotate the retentive element until it "locks" into the horizontal implant or by any other mechanism imaginable. The horizontal placed implant can have an orifice or a female attachment, or a male attachment or a receptacle exposed into the oral cavity, which will be ready to accept the retentive element. In such an embodiment, the patient's denture would have a retentive attachment apparatus instead of a complementary access hole. The retentive attachment apparatus, which is comprised of at least the retentive element, may vary in size, shape and conformation, and composition.

Figure 21C:
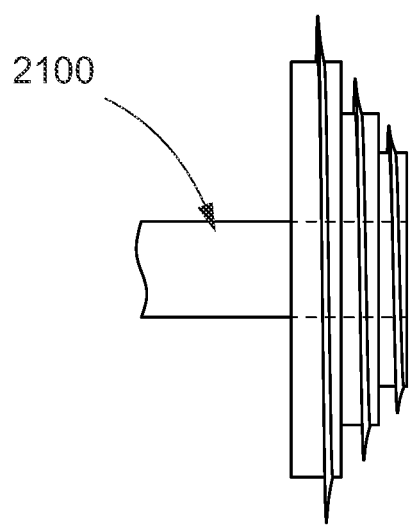
FIG. 21C is a side sectional view of an abutment of the horizontally placed implant system in accordance with an embodiment of the invention.

FIG. 21C is a side sectional view of a lateral edge of the horizontally placed implant system in accordance with an embodiment of the invention. In this view, it is assumed that the horizontally placed dental implant has been installed into the jawbone and has osseointegrated with the jawbone, and that the abutment is attachable to the horizontally placed implant. The most lateral surface of the implant end is where implant abutments, retentive elements, or any accessory attachment piece can attach. In this view, the broken lines illustrate the internal space in the horizontal placed dental implant. Persons having skill in the art will appreciate that many different architectural designs of the horizontal implant itself, as well as its internal space, are achievable. In this view, a retentive element or abutment 2100 is engaged with the horizontally placed dental implant. Persons having skill in the art will understand that the retentive element or abutment can be separate from the horizontal implant as well as the prosthesis or denture. Persons having skill in the art will further understand that a retentive element or abutment can emanate from the prosthesis or implant as well. Additionally, the retentive element or abutment can be placed within the horizontal implant first, and then engage with a retentive mechanism fixed in the prosthesis or denture. Persons having skill in the art will further understand that a retentive element or abutment can emanate from the implant as well; the retentive element can initially be in a retracted position within the confines of the implant body, and when needed, it can be activated to protrude from the implant body and into the oral cavity. Finally, the retentive element or abutment can be separate from both the implant and denture retentive mechanism; it can be manually inserted through the denture orifice or access point and engage the implant; at which point, the patient may twist, push, depress or activate the retentive mechanism manually or with a special tool.

FIG. 22A is a front view of a lateral edge of the horizontally placed implant system in accordance with an embodiment of the invention. In this view, it is assumed that the horizontally placed dental implant has been installed into the jawbone and has osseointegrated with the jawbone, and that the abutment is attachable to the horizontally placed implant. What is shown is the area of the dental implant embedded into the bone surface from where the implant end or ends protrude and where implant abutments can attach.

FIG. 22B is a side sectional view of a lateral edge of the horizontally placed implant system in accordance with an embodiment of the invention. In this view, it is assumed that the horizontally placed dental implant has been installed into the jawbone and has osseointegrated with the jawbone. In this view, the broken lines illustrate the internal space in the horizontal placed dental implant. Persons having skill in the art will appreciate that many different architectural designs of the horizontal implant itself, as well as its internal space can vary greatly.

FIG. 22C is a side sectional view of a lateral edge of the horizontally placed implant system in accordance with an embodiment of the invention. In this view, it is assumed that the horizontally placed dental implant has been installed into the jawbone and has osseointegrated with the jawbone, and that the abutment is attachable to the horizontally placed implant. The broken lines illustrate the internal space in the horizontal placed dental implant. Persons having skill in the art will appreciate that many different architectural designs of the horizontal implant itself, as well as its internal space can vary greatly. In this view, a retentive element or abutment 2200 is engaged with the horizontally placed dental implant. Persons having skill in the art will understand that the retentive element or abutment can be separate from the horizontal implant as well as the prosthesis or denture. Persons having skill in the art will further understand that a retentive element or abutment can emanate from the prosthesis or implant as well. Additionally, the retentive element or abutment can be placed within the horizontal implant first, and then engage with a retentive mechanism fixed in the prosthesis or denture. Persons having skill in the art will further understand that a retentive element or abutment can emanate from the implant as well; the retentive element can initially be in a retracted position within the confines of the implant body, and when needed, it can be activated to protrude from the implant body and into the oral cavity. Finally, the retentive element or abutment can be separate from both the implant and denture retentive mechanism; it can be manually inserted through the denture orifice or access point, and engage the implant. At which point, the patient may twist, push, depress or activate the retentive mechanism manually or with a special tool.

Figure 23A:
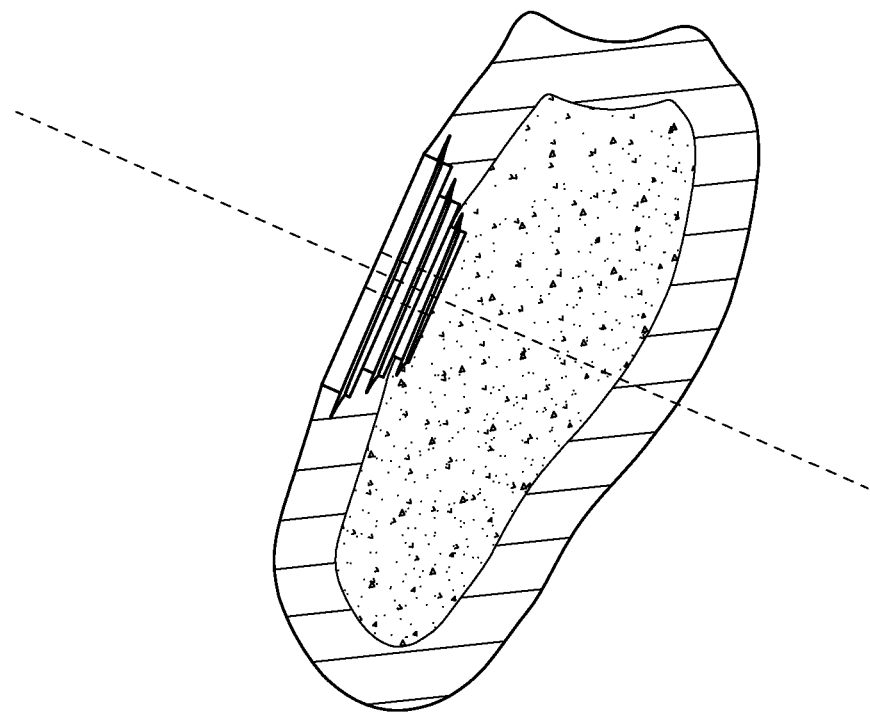
FIG. 23A is a side sectional view of an abutment of the horizontally placed implant system in accordance with an embodiment of the invention.

FIG. 23A is a side sectional view of a lateral edge of the horizontally placed implant system in accordance with an embodiment of the invention. In this view, it is assumed that the horizontally placed dental implant has been installed into the jawbone and has osseointegrated with the jawbone, and that the abutment is attachable to the horizontally placed implant. The angle of the jawbone, in this particular figure, is tapered to a greater extent than other drawings. What is shown is the area of the dental implant embedded into the bone surface from where the implant end or ends protrude and where implant abutments can attach. In this view, the broken lines illustrate the internal space in the horizontal placed dental implant. Persons having skill in the art will appreciate that many different architectural designs of the horizontal implant itself, as well as its internal space.

Figure 23B:
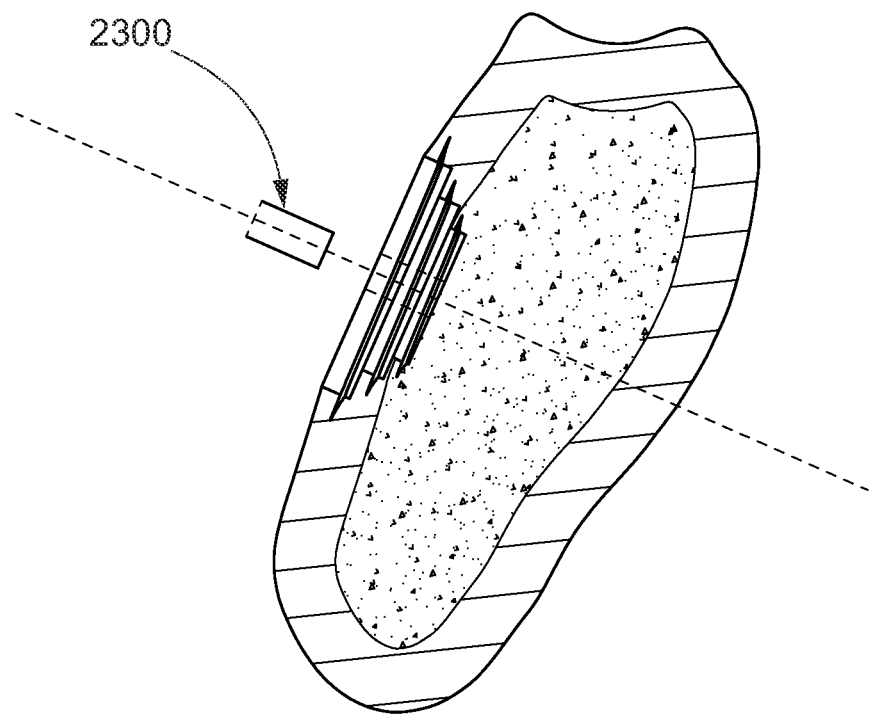
FIG. 23B is a side sectional view of an abutment of the horizontally placed implant system in accordance with an embodiment of the invention.

FIG. 23B is a side sectional view of a lateral edge of the horizontally placed implant system in accordance with an embodiment of the invention. In this view, it is assumed that the horizontally placed dental implant has been installed into the jawbone and has osseointegrated with the jawbone, and that the abutment is attachable to the horizontally placed implant. In this view, the broken lines illustrate the internal space in the horizontal placed dental implant. Persons having skill in the art will appreciate that many different architectural designs of the horizontal implant itself, as well as its internal space. In this view, a retentive element or abutment 2300 is engaged with the horizontally placed dental implant. Persons having skill in the art will understand that the retentive element or abutment can be separate from the horizontal implant as well as the prosthesis or denture. Persons having skill in the art will further understand that a retentive element or abutment can emanate from the prosthesis or implant as well. Additionally, the retentive element or abutment can be placed within the horizontal implant first, and then engage with a retentive mechanism fixed in the prosthesis or denture. Persons having skill in the art will further understand that a retentive element or abutment can emanate from the implant as well; the retentive element can initially be in a retracted position within the confines of the implant body, and when needed, it can be activated to protrude from the implant body and into the oral cavity. Finally, the retentive element or abutment can be separate from both the implant and denture retentive mechanism; it can be manually inserted through the denture orifice or access point, and engage the implant. At which point, the patient may twist, push, depress or activate the retentive mechanism manually or with a special tool.

Figure 24A:
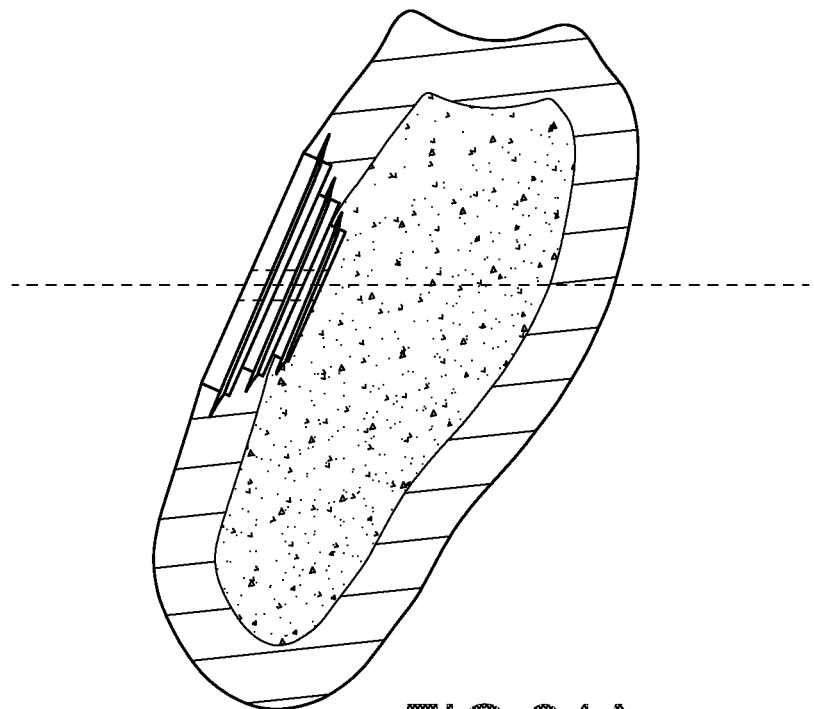
FIG. 24A is a side sectional view of an abutment of the horizontally placed implant system in accordance with an embodiment of the invention.
Figure 24B:
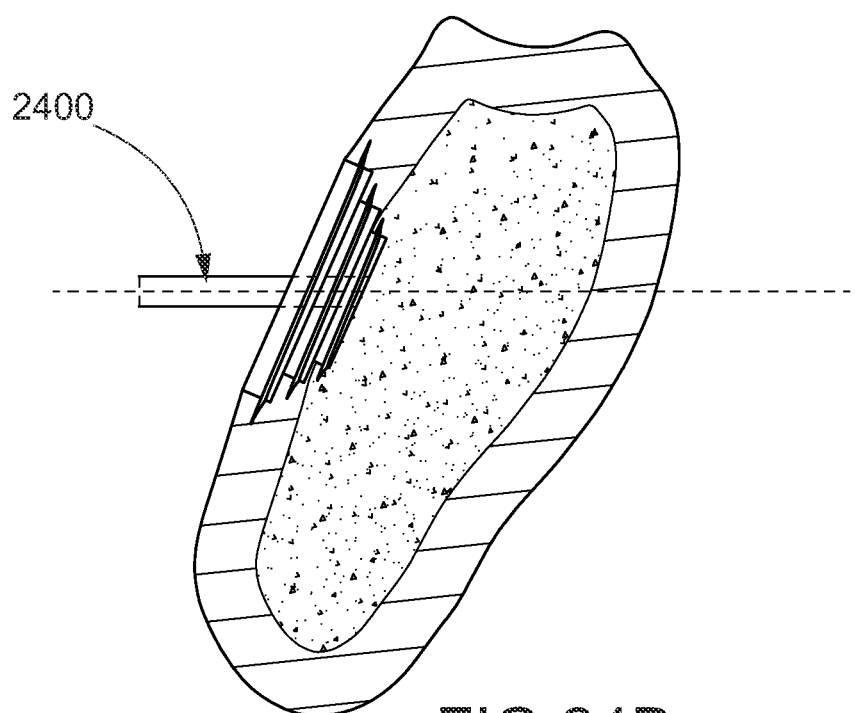
FIG. 24B is a side sectional view of an abutment of the horizontally placed implant system in accordance with an embodiment of the invention.

FIG. 24A is a side sectional view of a lateral edge of the horizontally placed implant system in accordance with an embodiment of the invention. In this view, it is assumed that the horizontally placed dental implant has been installed into the jawbone and has osseointegrated with the jawbone, and that the abutment is attachable to the horizontally placed implant. In this view, the broken lines illustrate the internal space in the horizontal placed dental implant. Persons having skill in the art will appreciate that many different architectural designs of the horizontal implant itself, as well as its internal space. Persons having skill in the art will appreciate that the internal space in both FIG. 24A and FIG. 24B is not perpendicular to the implant surface as in previous Figures. This is one of many embodiments of the horizontally placed implant system which make it an extremely new, unique, broad solution with very versatile options as compared to traditional dental implants.

FIG. 24B is a side sectional view of implant end of the horizontally placed implant system in accordance with an embodiment of the invention. In this view, it is assumed that the horizontally placed dental implant has been installed into the jawbone and has osseointegrated with the jawbone, and that the abutment is attachable to the horizontally placed implant. In this view, the broken lines illustrate the internal space in the horizontal placed dental implant. Persons having skill in the art will appreciate that many different architectural designs of the horizontal implant itself, as well as its internal space. In this view, a retentive element or abutment 2400 is engaged with the horizontally placed dental implant. Persons having skill in the art will understand that the retentive element or abutment can be separate from the horizontal implant as well as the prosthesis or denture. Persons having skill in the art will further understand that a retentive element or abutment can emanate from the prosthesis or implant as well. The retentive element or abutment can be placed within the horizontal implant first, and then engage with a retentive mechanism fixed in the prosthesis or denture. Persons having skill in the art will further understand that a retentive element or abutment can emanate from the implant as well; the retentive element can initially be in a retracted position within the confines of the implant body, and when needed, it can be activated to protrude from the implant body and into the oral cavity. Finally, the retentive element or abutment can be separate from both the implant and denture retentive mechanism; it can be manually inserted through the denture orifice or access point, and engage the implant. At which point, the patient may twist, push, depress or activate the retentive mechanism manually or with a special tool.

As a general method of installing and using a horizontally placed dental implant system, comprehensive treatment planning is essential. As a method of installation and use, three major steps must be addressed. The first step includes a thorough evaluation of the patient's medical and dental history. The second step involves a proper diagnosis. The third step involves an appropriate treatment course.

A thorough evaluation of a patient's medical history can provide a clinician or practitioner necessary information to assess a patient's state of oral health. Certain patients may be unsuitable candidates for the horizontally placed dental implant system because of advanced bone loss or other health considerations unconducive to the horizontally placed dental implant system.

For suitable candidates, a proper diagnosis of a patient's jawbone can include, but is not limited to, radiographs and cone beam computed tomography (FMX, panoramic, cephalometric x-rays, and CBCT), study models, and a thorough clinical examination. Such diagnostic procedures are paramount to having enough information to perform a proper diagnosis of a patient's general state of dental health as well as assess bone quality, bone quantity, and proper and sufficient space for the horizontally placed implant system and any and all prostheses to be used in conjunction with the horizontally placed implant system. This step involves making a determination to prescribe use of the endosteal horizontally placed dental implant system. A treatment plan is then compiled and presented to the patient for thorough discussion and to obtain patient's informed consent with regards to a treatment procedure. From there, a clinician can choose one or more appropriately sized implants for the patient. The clinician can then choose one or more appropriately sized dental implant abutments to couple with the one or more appropriately sized implants. The abutments may not be placed at this surgical visit, the clinician may wait a few months (3-6) to allow for proper and adequate osseointegration before introducing the abutment. When the patient is ready, the clinician can then design and fabricate one or more implant supported prostheses to couple with the one or more appropriately sized dental implant abutments. It is important to note that the horizontally placed implant system is extremely versatile, it may be used as a stand-alone system or it also may be used in conjunction with traditional dental implants or small diameter implants (Mini dental implants); thereby increasing the potential surgical and restorative options exponentially, to a level that has not been realized in dentistry until now. Persons having skill in the art will readily appreciate that the size and shape and configuration of the dental implant, the dental implant abutment and the dental implant prosthesis can vary depending on patient need.

The next step of a method of installing and using a horizontally placed dental implant system involves surgically placing the appropriately sized implant by way of a non-crestal approach. Persons having skill in the art will appreciate that the surgical steps consist generally of the use of profound local anesthesia (or general anesthesia in some circumstances), placing a surgical template or stent in the mouth or oral cavity, and making an appropriately sized incision along the gum of the maxilla or mandible for a non-crestal approach.

When the surgical site is accessible, a pilot drill is used to prepare the jawbone for the horizontally placed dental implant by creating an osteotomy site. Skilled artisans will recognize that osteotomy burs of varying size are used incrementally, with increasing widths of the osteotomy bur being used to reach the desired width and depth for the horizontally placed dental implant. Guide pins and/or parallel pins are used to verify placement location, angle and depth, and are placed in the osteotomy or drill site. During the surgical procedure, a clinician can use a cone-beam computed tomography system (CBCT) to further check the accuracy of the surgical progression in real time.

Once the desired osteotomy width, depth and angle have been achieved, the implant is then placed in the in the osteotomy site. The implant can be placed by hand via an implant placement tool or with a dental handpiece or a combination of the two. Persons skilled in the art will understand that the force required to insert a dental implant is called insertion torque. It is the amount of force required to turn the implant so as to engage the threads of the implant with bone. Skilled artisans will further understand that a torque wrench, as well as the implant placement motor (handpiece unit used to place the implant) can measure the amount of torque used to set an implant in place, which is typically measured in newton centimeters. In embodiments of the invention, the torque required can range anywhere from 35 newton centimeters to upwards of 75 newton centimeters.

Once the implant has been set to a desired torque setting, a cover screw can be placed over the lateral end(s) of the implant to seal the implant orifice. A clinician may also use an implant abutment or healing collar which may or may not protrude beyond the level of the soft tissue after the clinician closes the surgical site. If a patient is currently wearing a removable prosthesis or prostheses, such prostheses can be removed or "relieved" by the clinician in order to avoid putting any unnecessary forces on the newly placed implant.

When the implant placement is complete, sutures are then placed, and the surgical incision is closed. The clinician will then monitor the patient to ensure hemostasis. Post operative cone-beam computed tomography and/or panoramic radiography or other imaging methods known and appreciated in the art are used to ensure proper placement.

Once the procedure is finished, the patient is released with post-operative homecare instructions given to the patient. The horizontally placed dental implants are then allowed to osseointegrate with the jawbone. The process of osseointegration may vary due to factors such as patient age, medical history, the type or density of bone, and physiology. A clinician should check the progress of osseointegration at regular intervals. Once osseointegration is complete, dental implant abutments can be coupled with the dental implants. Dentures or other prostheses can then be coupled with the dental implant abutments already coupled with the dental implants.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the horizontally placed dental implant system and method, other equivalent or alternative methods of implementing the horizontally placed dental implant system and method according to the present invention will be apparent to those skilled in the art. Various aspects of the horizontally placed dental implant system and method have been described above by way of illustration, and the specific embodiments disclosed are not intended to limit the invention to the particular forms disclosed. For example, embodiments of the horizontally placed dental implant system and method may be configured to provide for different abutments or extensions, or different anatomical and physiological variations in patients. In other embodiments, different shapes and configurations of implants may be used. The particular implementation of the horizontally placed dental implant system and method may vary depending upon the particular context or application. By way of example, and not limitation, the horizontally placed dental implant system and method described in the foregoing was principally directed to patients requiring better fitting dentures or partials. However, similar techniques may instead be applied to patients who may seek permanent "non-removable" restorative or prosthetic options. Additionally, differing combinations and arrangements of existing implant technologies may be configured to such a endosteal horizontally placed dental implant system. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Although specific features of the horizontally placed dental implant system and method are shown in some drawings and not others, persons skilled in the art will understand that this is for convenience. Each feature may be combined with any or all of the other features in accordance with the invention. The words "including," "comprising," "having," and "with" as used herein are to be interpreted broadly and comprehensively, and are not limited to any physical interconnection. Claim elements and steps herein may have been numbered and/or lettered solely as an aid in readability and understanding. Any such numbering and lettering in itself is not intended to and should not be taken to indicate the ordering of elements and/or steps in the claims to be added at a later date. It is also to be understood that there can be two approaches to the retentive design of the removable prosthesis. The denture can be secured "permanently", meaning that the denture remains in the mouth and is not removed on a daily basis by the patient. The patient will then periodically visit the dentist for denture and implant maintenance; usually between 3 and 6 months. Routinely, this visit would entail professional removal of the denture, cleaning of the prosthesis, cleaning the implant area, replacement of any parts subject to normal wear and tear, and to re-connect the denture mechanism apparatus. The second approach includes the retentive design which allows the patient to remove the denture daily, or as needed without needing a dentist to do so. As one would imagine, the retentive mechanism design may vary between the two retentive method options.

Any amendment presented during the prosecution of the application for this patent is not a disclaimer of any claim element presented in the description or claims to be filed. Persons skilled in the art cannot reasonably be expected to draft a claim that would literally encompass each and every equivalent.

What is claimed is:

1. An endosteal horizontally placed non-crestal dental implant system comprising:
    a. at least one dental implant having a proximal end, a distal end, an internal architecture, and a helical thread extending along the outside region between the said proximal end and the said distal end, said implant configured to be implanted horizontally or near horizontally by way of a non-crestal approach into a mandible or maxilla, said mandible or maxilla having a lingual or palatal side and a buccal side, and said implant being configured to be implanted from either the buccal side towards the lingual or palatal side or from the lingual or palatal side towards the buccal side at an angle which maximizes engagement with previously unusable bone tissue from the mandible or maxilla such that the osseointegrated surface area of the implant is increased, and further wherein the cross-sectional diameter of the implant is uniform throughout the length of the implant; and
    b. at least one dental implant abutment having a proximal end for attaching to the said dental implant and a distal end configured for the attachment of a dental prosthesis;
    wherein the proximal and distal ends of the at least one dental implant are configured to assume an angular configuration relative to the at least one dental implant abutment, and further wherein the at least one dental implant abutment can be positioned at an angle neither parallel with nor perpendicular to the at least one dental implant.

2. The endosteal horizontally placed non crestal dental implant system of claim 1 wherein the at least one dental implant abutment attaches to the dental implant by a screw mechanism.

3. The endosteal horizontally placed non crestal dental implant system of claim 1 wherein a dental implant is inserted horizontally or near horizontally at into a mandible or maxilla from either the buccal side towards the lingual or palatal side or from the lingual or palatal side towards the buccal side at an angle which maximizes engagement with a mandible or maxilla.

4. The endosteal horizontally placed non crestal dental implant system of claim 1 wherein the at least one dental implant abutment employs a ball and socket attachment mechanism to which dental prostheses attach.

5. The endosteal horizontally placed non crestal dental implant system of claim 1 wherein the proximal and distal ends of the at least one dental implant can be truncated so as to facilitate insertion of the said at least one dental implant.

6. The endosteal horizontally placed non crestal dental implant system of claim 1 wherein the at least one dental implant has an internal architecture which extends from the proximal end of the said at least one dental implant inwardly towards the distal end of the said at least one dental implant.

7. The endosteal horizontally placed non crestal dental implant system of claim 1 wherein a retention bar can connect at least one dental implant with another dental implant.

8. The endosteal horizontally placed non crestal dental implant system of claim 1 wherein a retention spring can connect at least one dental implant with another dental implant.

9. An endosteal horizontally placed non crestal dental implant system comprising:
    a. at least one dental implant having a proximal end, a distal end, an internal architecture, and a helical thread extending along the outside region between the said proximal end and the said distal end, said implant configured to be implanted horizontally or near horizontally by way of a non-crestal approach, into a mandible or maxilla and to engage with bone tissue; and
    b. at least one dental implant abutment having a proximal end for attaching to the said dental implant and a distal end for the attachment of a dental prosthesis;
    wherein the proximal and distal ends of the at least one dental implant each include an orifice such that the at least one dental implant abutment is configured to attach to either the proximal end or the distal end and is configured to assume an angular configuration, and further wherein the at least one dental implant abutment can be positioned at an angle neither parallel with nor perpendicular to the at least one dental implant.

10. The endosteal horizontally placed non crestal dental implant system of claim 9 wherein the at least one dental implant includes an orifice to act as the female component to a male retentive element or abutment.

11. The endosteal horizontally placed non crestal dental implant system of claim 9 wherein the at least one dental implant abutment attaches to the dental implant by a screw mechanism.

12. The endosteal horizontally placed non crestal dental implant system of claim 9 wherein a dental implant is inserted horizontally or near horizontally at into a mandible or maxilla from either the buccal side towards the lingual or palatal side or from the lingual or palatal side towards the buccal side at an angle which maximizes engagement with a mandible or maxilla.

13. The endosteal horizontally placed non crestal dental implant system of claim 9 wherein the at least one dental implant abutment employs a ball and socket attachment mechanism to which the said dental prosthesis attach.

14. The endosteal horizontally placed non crestal dental implant system of claim 9 wherein the at least one dental implant has an internal architecture which extends from the proximal end of the said at least one dental implant to the distal end of the said at least one dental implant.

15. The endosteal horizontally placed non crestal dental implant system of claim 9 wherein the at least one dental implant is implanted bilaterally in a mandible or maxilla wherein dental implant abutments can attach to both the proximal end and the distal end of the at least one dental implant.

16. The endosteal horizontally placed non crestal dental implant system of claim 9 wherein a retention bar can connect at least one dental implant with another dental implant.

17. The endosteal horizontally placed non crestal dental implant system of claim 9 wherein a retention spring can connect at least one dental implant with another dental implant.

18. A method for patient diagnosis and the installation of a endosteal horizontally placed non crestal dental implant system having at least one dental implant having a proximal end, a distal end, and a helical thread extending along the outside region between the said proximal end and the said distal end, said implant configured to be implanted by way of a non-crestal approach horizontally, or near horizontally, into a mandible or maxilla, said mandible or maxilla having a lingual or palatal side and a buccal side, and said implant being configured to be implanted from either the buccal side towards the lingual or palatal side or from the lingual or palatal side towards the buccal side at an angle which maximizes engagement with bone tissue from the mandible or maxilla; and at least one dental implant abutment having a proximal end for attaching to the said dental implant at either the proximal end or the distal end of the dental implant and a distal end for the attachment of a dental prosthesis and a dental prosthesis comprising the steps of:
 a. performing a comprehensive patient evaluation using patient records and diagnostic methods;
 b. making a determination to prescribe use of the horizontally placed dental implant system;
 c. choosing one or more appropriately sized implants;
 d. choosing one or more appropriately sized dental implant abutments;
 e. choosing one or more appropriately sized dental implant prostheses;
 f. surgically placing the appropriately sized implant by way of a non-crestal approach;
 g. allowing the surgically placed appropriately sized implant to osseointegrate;
 h. coupling at least one dental implant abutment to the surgically placed and osseointegrated horizontally placed dental implant; and
 i. coupling at least one dental prosthesis to the at least one dental implant abutment coupled to the surgically placed and osseointegrated dental implant.

\* \* \* \* \*